US012769748B2

(12) United States Patent
Bieck et al.

(10) Patent No.: US 12,769,748 B2
(45) Date of Patent: Oct. 20, 2026

(54) SYSTEM AND METHOD OF MULTILINGUAL SEMANTIC AND LEXICAL HYBRID SEARCH SCORING FOR ARTIFICIAL INTELLIGENCE PRODUCTIVITY TOOL-ENABLABLE APPLICATION CAPABILITIES FOR A USER QUERY INPUT

(71) Applicant: Dell Products LP, Round Rock, TX (US)

(72) Inventors: Emma Rose Bieck, Ithaca, NY (US); Ashutosh Singh, Austin, TX (US); Mona Sachdev, Round Rock, TX (US)

(73) Assignee: DELL PRODUCTS LP, Round Rock, TX (US)

(*) Notice: Subject to any disclaimer, the term of this patent is extended or adjusted under 35 U.S.C. 154(b) by 0 days.

(21) Appl. No.: 18/911,515

(22) Filed: Oct. 10, 2024

(65) Prior Publication Data

US 2026/0105054 A1 Apr. 16, 2026

(51) Int. Cl.

| | |
|---|---|
| ***G06F 16/2457*** | (2019.01) |
| ***G06F 16/242*** | (2019.01) |
| ***G06F 40/284*** | (2020.01) |
| ***G06F 40/289*** | (2020.01) |
| ***G06F 40/30*** | (2020.01) |

(52) U.S. Cl.

CPC ...... *G06F 16/24578* (2019.01); *G06F 16/243* (2019.01); *G06F 40/284* (2020.01); *G06F 40/289* (2020.01); *G06F 40/30* (2020.01)

(58) Field of Classification Search

CPC ............. G06F 16/24578; G06F 16/243; G06F 40/284; G06F 40/289; G06F 40/30

See application file for complete search history.

(56) References Cited

U.S. PATENT DOCUMENTS

| | | | |
|---|---|---|---|
| 8,380,714 | B2 | 2/2013 | Inagaki |
| 8,548,951 | B2 | 10/2013 | Solmer |
| 9,201,957 | B2 | 12/2015 | Turdakov |

(Continued)

FOREIGN PATENT DOCUMENTS

| | | | |
|---|---|---|---|
| WO | 2020/192587 | A1 | 10/2020 |
| WO | 2021/050382 | A1 | 3/2021 |
| WO | 2023/249666 | A1 | 12/2023 |

*Primary Examiner* — Ken Hoang

(74) *Attorney, Agent, or Firm* — Prol Intellectual Property Law, PLLC; H. Kenneth Prol

(57) ABSTRACT

An information handling system executing computer readable code instructions for an on the box artificial intelligence productivity tool to receive a user query input and, with a language dependent hybrid weighting algorithm determine a variable weighting factor based on a portion of the user query input that is in a primary language that is also used in descriptions of capabilities on the information handling system and any terms having a high keyword relevance score, and determining a language-dependent hybrid weighted semantic search score for each of the capabilities relative to the user query input by weighting the cosine semantic search score of a semantic comparison by a lexical keyword comparison score as modified by the variable weighting factor for the user query input. A hardware processor to identify and execute a responsive capability for the received user query input based on its language-dependent hybrid weighted semantic search score.

20 Claims, 9 Drawing Sheets

(56) References Cited

U.S. PATENT DOCUMENTS

| | | | |
|---|---|---|---|
| 9,218,412 B2 | 12/2015 | Wang | |
| 9,626,358 B2 | 4/2017 | Danielyan | |
| 9,633,085 B2 | 4/2017 | Kamotsky | |
| 9,648,683 B2 | 5/2017 | Kangyo | |
| 10,146,593 B2 | 12/2018 | Gong | |
| 11,620,262 B2 | 4/2023 | Lee | |
| 11,777,875 B2 * | 10/2023 | Uppala | G06Q 10/02 709/206 |
| 11,948,073 B2 | 4/2024 | Zhang | |
| 2018/0365065 A1 | 12/2018 | Guttman | |
| 2020/0387550 A1 | 12/2020 | Cappetta | |
| 2020/0394360 A1 | 12/2020 | Dunn | |
| 2021/0216576 A1 | 7/2021 | Staub | |
| 2021/0256207 A1 | 8/2021 | Dunn | |
| 2021/0334194 A1 | 10/2021 | Xiao | |
| 2021/0366506 A1 | 11/2021 | Han | |
| 2021/0374353 A1 | 12/2021 | Zhang | |
| 2022/0035684 A1 | 2/2022 | Gupte | |
| 2022/0035732 A1 | 2/2022 | Xiao | |
| 2022/0092439 A1 | 3/2022 | Liu | |
| 2022/0318502 A1 | 10/2022 | Howell | |
| 2023/0105806 A1 | 4/2023 | Dunn | |
| 2023/0186025 A1 * | 6/2023 | John | G06F 16/243 704/9 |
| 2023/0222359 A1 | 7/2023 | Panikkar | |
| 2023/0237263 A1 | 7/2023 | Howell | |
| 2023/0251962 A1 | 8/2023 | Xiao | |
| 2023/0267374 A1 | 8/2023 | Polleri | |
| 2023/0336340 A1 | 10/2023 | Polleri | |
| 2023/0409277 A1 | 12/2023 | Sharifi | |
| 2024/0007414 A1 | 1/2024 | Jain | |
| 2024/0037346 A1 | 2/2024 | Chorakhalikar | |
| 2024/0054318 A1 | 2/2024 | Feltin | |
| 2024/0061719 A1 | 2/2024 | Reddy | |
| 2024/0069770 A1 | 2/2024 | Prabhakar | |
| 2024/0069959 A1 | 2/2024 | Prabhakar | |
| 2024/0070113 A1 | 2/2024 | Prabhakar | |
| 2024/0152568 A1 * | 5/2024 | Morris | G06F 16/9532 |
| 2024/0161003 A1 | 5/2024 | Alexander | |

* cited by examiner

SYSTEM AND METHOD OF MULTILINGUAL SEMANTIC AND LEXICAL HYBRID SEARCH SCORING FOR ARTIFICIAL INTELLIGENCE PRODUCTIVITY TOOL-ENABLABLE APPLICATION CAPABILITIES FOR A USER QUERY INPUT

FIELD OF THE DISCLOSURE

The present disclosure relates to execution of computer readable code instructions of artificial intelligence (AI) productivity tools with an information handling system. The present disclosure more specifically relates systems and methods of identifying an artificial intelligence productivity tool-enableable software application capability that is a best match for an action requested in one of plural supported languages by a user within a received user query input using a keyword-sensitive or text frequency-inverse document frequency (TF-IDF) hybrid weighted score that is language-dependent for a semantic similarity search across a plurality of such capabilities.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more software applications such as workspace productivity applications, or gaming applications or the like. Further, the information handling system may include AI productivity tools that interface with various AI productivity tool-enablable software applications such as natural language chat-enabled environments for interface with services of software applications that increase the efficiency of the operation of the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
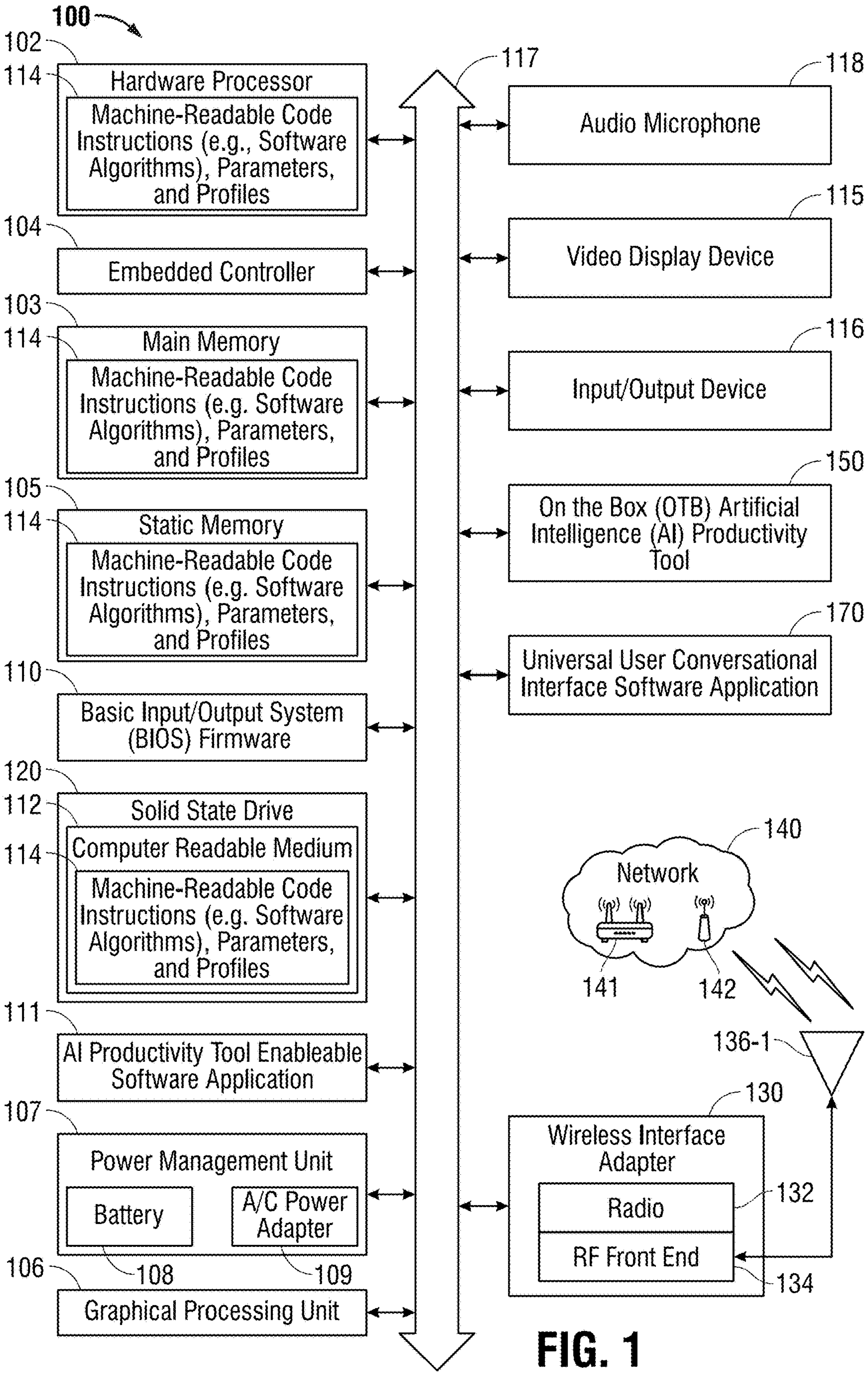
FIG. 1 is a block diagram illustrating an information handling system that includes an on the box (OTB) artificial intelligence (AI) productivity tool to select among a plurality of AI productivity tool-enablable software application capabilities for services, operations, or responses to a user query input in one of a plurality of supported languages with language-dependent hybrid weighted semantic search scoring according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Artificial intelligence (AI) is a developing technology that is used to increase efficiency of computing systems and interactions with humans. An example of AI technologies includes, but is not limited to, chat-enabled environments (voice, text, etc.). These chat-enabled environments are described in embodiments herein as an on the box (OTB) AI productivity tool that receives this voice or text input from a user and implements a number of actions or utilizes services of various software applications based on the natural language of the input. In some information handling systems, the OTB AI productivity tool may interface with various AI productivity tool-enablable software applications being executed or executable on the information handling system. These AI productivity tool-enablable software applications may integrate with the OTB AI productivity tool to allow user queries to trigger certain actions declared, supported, and managed by these AI productivity tool-enablable software applications.

A hardware processor executing code instructions of the OTB AI productivity tool in embodiments herein may match these received user queries, or user query inputs to known capabilities of one or more of the AI productivity tool-enableable software applications through execution by a hardware processor of machine readable code instructions for one or more natural language processing machine learning models. This process includes gathering, either in real-time or having already gathered prior to execution of the OTB AI productivity tool, capabilities associated with each of a plurality of AI productivity tool-enablable software applications. These capabilities (also called capability intents and having capability intent values) may describe those functionalities of each of the AI productivity tool-enablable software applications that may be used when interfacing with the OTB AI productivity tool. These natural language descriptions of the capabilities for the AI productivity tool-enableable software applications may be stored within a natural language capability database for comparison to received user query inputs, for example, in order to identify a capability most likely to address a user's request within the received user query inputs. Often, the natural language descriptions of these capabilities gathered from AI productivity tool-enableable software applications are created or generated in a primary language, for example, in the English language in embodiments herein. Such a system works well for user query inputs collected and processed in the same primary language (e.g., English), but the TF-IDF or keyword matching and weighting may be less effective when user query inputs are received in a language other than the primary language used for the natural language descriptions of the capabilities gathered from the AI productivity tool-enableable software applications on the information handling system.

A hardware processor executing machine readable code instructions for a capability intent value generator of the OTB AI productivity tool may determine capability intent values associated with these natural language descriptions of the gathered capabilities for each of a plurality of AI productivity tool-enablable software applications. These capability intent values are a mathematical representation of capability operations or services from various AI productivity tool-enablable software applications in embodiments herein. These capability intent values may be represented by a mathematical value in a multi-axis vector space that may be associated with a natural language description for that capability or intent. In an embodiment, the capabilities may be associated with an identification (ID) such as an alphanumeric ID that also may be stored within a capability intent values database. Generating such capability intent values as vectors may be a first step in a natural language processing method to determine and correlate the user's query intent or requested action within a user query input that takes into account the context or semantics of the words used within the user query input with one of a plurality of capabilities. While the capability intent values are embedded from a primary language (e.g., English) natural language descriptions of capabilities, the capability intent values as a mathematical representation in a multi-axis vector space may still work well with user query inputs from other languages that also embed these other-language user query inputs to generate a query intent value for semantic similarity matching to the capability intent value in embodiments herein. Thus, user query inputs of any supported language may be embedded in a query intent value in the multi-axis vector space and still operate with semantic similarity matching with a capability intent value derived from a primary language natural language description in some embodiments. This avoids the need for plural natural language descriptions in multiple languages to be created for all of the capabilities of AI productivity tool-enableable software applications on an information handling system.

Upon receipt of a user query input by the OTB AI productivity tool in embodiments herein, a hardware processor executing code instructions of a query intent determination module or plural query intent determination modules may identify a language used and generate or embed a vectorized query input intent value for the user query input that may be comparable to the capability intent values regardless of the language used in the capability natural language description. The hardware processor executing machine readable code instructions for a query intent to capability determination module in embodiments herein may then perform one or more similarity search methods to match the query input intent value with a capability intent value in order to identify a capability for an AI productivity tool-enableable software application that most closely corresponds and can address the user request within the user query input.

In embodiments herein, a hardware processor may execute machine readable code instructions for a semantic similarity search machine learning model that analyzes and weighs context and relevancy as well as semantic meaning values in vectorized intent values in a semantic similarity search algorithm for comparing a query input intent value derived from any of a plurality of supported languages with a capability intent value derived, usually, from a primary language. For example, in embodiments herein, a hardware processor may execute machine readable code instructions for a semantic similarity search machine learning model, via a query intent to capability module, that compares the vectorized user query input intent value and the capability intent values stored within the capability intent values database. Such a comparison may be performed using a semantic search machine learning model, such as a cosine similarity search that compares the distance or value difference in a multi-axis vector space between two vectors (e.g., the capability intent value vector and the user query input value vector) to determine the contextual similarity between the natural language description of the capability and the natural language user query input. Such a contextual or semantic search methodology may take into account the fact that the same word may have two meanings or consider synonyms of words, for example. This may be performed on behalf of user query inputs provided in a plurality of supported languages and for comparison with several of the capability intent values derived from a primary language natural language description to identify a capability intent value that most closely matches the user query input intent value. The capability intent values and natural language description of the capabilities may be stored within the capability intent value database, a natural language capability database, or a blended database having both for reference. In such a way, a hardware processor executing code instructions for the query intent to capability module for the OTB AI productivity tool may take relevance and context of natural language within a user query input into account when determining a matching capability of an AI productivity tool enableable software application that is most likely to address the user's intent within the user query input.

Another methodology for matching text or documents in embodiments herein may center upon keyword searches, such as term frequency-inverse document frequency (TF-IDF) searches. TF-IDF searches in this context focus upon the frequency of a term or keyword found within a user query input and within known capabilities for the AI productivity tool enableable software applications. TF-IDF methodologies lack the ability to determine context of the various keywords identified within the user query input, but may be more effective in determining responsive capabilities when a particular keyword is able to be matched with a natural language description of a capability, however. For example, TF-IDF methodologies cannot discern between different meanings for the same word or identify synonyms for keywords, which people routinely employ in natural language conversation. While this may result in limits for matching between natural language text excerpts, such as the user query input and the software service or function described in a natural language description of the capability for an AI productivity tool-enableable software application, keywords within the user query input may be important to the user's query and may more accurately and accurately correspond to the desired natural language description of a capability that would be responsive. This accuracy is helpful in embodiments of the present disclosure, but problems arise if the user query input is submitted in a language other than the primary language used for the natural language descriptions of the capabilities available. In some embodiments, mixed-language user query inputs may be provided, such as including English or other words (error codes), within the non-primary language user query input that may be nonetheless recognized as keywords corresponding with the natural language descriptions of the capabilities. Additionally, sometimes the words for particular things that may be keywords are identical or very similar among primary and other non-primary languages.

While semantic search methodologies are better-suited for use with generated intent values of user query inputs or natural language text descriptions of capabilities than TF-IDF methodologies that do not consider context, TF-IDF methodologies are better-suited than semantic search methodologies where a single keyword within the user query input is important to identifying a matching capability for an AI productivity tool-enableable software application to address the user's concerns. For example, a user may provide a natural language user query input such as "resolve error code 0xc0000142." In such a scenario the semantic search methodologies may identify that an error code needs to be resolved, but it may not focus heavily on the term "0xc0000142," which may be critical to finding the right AI productivity tool enableable software application to resolve the error code. In such a case, it may be useful to also perform a TF-IDF comparison across the stored natural language descriptions of the capabilities within the natural language capabilities database to identify the capability that best addresses the specific term "0xc0000142," according to embodiments herein.

As described in embodiments herein, a hardware processor executing machine readable code instructions for the query intent to capability determination module of the OTB AI productivity tool may compare the vectorized user query input intent value and each of several capability intent values using a semantic search approach, such as a cosine similarity search or comparison. Thus, the hardware processor executing machine readable code instructions for the query intent to capability determination module may compare a single user query input to a plurality of natural language capabilities for AI productivity tool enableable software applications. In order to increase the accuracy of these semantic comparison results, the hardware processor executing machine readable code instructions for the query intent to capability determination module of the OTB AI productivity tool in embodiments herein may, for each compared user query input and natural language capability, perform a TF-IDF comparison. The output of the semantic search comparison may then be weighted by the TF-IDF comparison for each natural language capability compared to the user query input, via the hardware processor executing machine readable code instructions of the query intent to capability determination module. The natural language capability for an AI productivity tool enableable software application having the highest weighted score may then be identified, via execution of machine readable code instructions of the query intent to capability determination module by the hardware processor as the capability most likely to address the user's intended request within the natural language user query input. In such a way, the hardware processor executing code instructions for the query intent to capability module for the OTB AI productivity tool may enhance semantic search performance by also considering critical keywords when determining a matching capability of an AI productivity tool enableable software application that is most likely to address the user's intent within the user query input.

In some embodiments of the present disclosure, the user query inputs may be received in the primary language, in a non-primary second language with some overlapping terms, in a blended non-primary second language with some terms included from the primary language, or entirely in a non-primary second language. The primary language is the language used in natural language descriptions of available capabilities for selection by the AI productivity tool to respond to the user query input. Embodiments of the present disclosure may determine the language of each of the words in the received user query input and determine how many or what portion are included from the primary language used in natural language descriptions of the capabilities. Further, terms in the primary language may be assessed for a keyword relevance score, such as uniqueness or descriptiveness of a hardware component, software, firmware, or action of the same. With this information, the hardware processor executing machine readable code instructions for a language-dependent hybrid weighting algorithm may determine a variable weighting factor to be applied, such as via multiplication, against any lexical keyword comparison score weighting applied to a semantic similarity search score in embodiment herein.

In an embodiment, the hardware processor executing machine readable code instructions for the query intent to capability determination module of the OTB AI productivity tool may compare the vectorized user query input intent value and each of several capability intent values using a semantic search approach, such as a cosine similarity search or comparison as well as a TF-IDF comparison for keywords. Then the hardware processor executing machine readable code instructions for the query intent to capability determination module of the OTB AI productivity tool may select a language dependent weighting to be applied with the TF-IDF keyword comparison to generate a language-dependent hybrid weighted semantic similarity search score for comparison across multiple capabilities to identify a responsive capability. In this way, the OTB AI productivity tool and the query intent to capability determination module of the OTB AI productivity tool may operate to service a plurality of supported languages as well as accommodate blended language user query inputs in embodiments herein. The OTB AI productivity tool utilizes the variable weighting factor generated by the language-dependent hybrid weighting algorithm to provide enhanced and more accurate results identifying responsive capabilities using TF-IDF keyword comparison weighting, if and where available, to generate the language-dependent hybrid weighted semantic similarity search score based on primary-language terms, and their keyword relevance, appearing in the user query input.

Turning now to the figures, FIG. 1 illustrates an information handling system 100 similar to the information handling systems according to several aspects of the present disclosure. As described herein, hardware processor 102 executing machine-readable code instructions of an on the box (OTB) artificial intelligence (AI) productivity tool 150 in an embodiment may perform one or more similarity search methods to match a received query and query input intent value with a capability intent value and capability in order to identify a capability intent action for an AI productivity tool-enableable software application 111 that can respond and address the user request within the user query input. The OTB AI productivity tool 150 in an embodiment may receive, via a universal user conversational interface software application 170 or other audio or text interface, a voice or text input from a user, described herein as a user query input, that requests actions or services of various software applications in natural language. In embodiments of the present disclosure, the OTB AI productivity tool 150 in an embodiment may receive, via a universal user conversational interface software application 170 or other audio or text interface, a voice or text input from a user in one of a plurality of supported languages.

The hardware processor 102 may execute machine readable code instructions for a semantic similarity search machine learning model, supporting user query inputs in each of the plurality of supported languages, that analyzes and weighs context and relevancy of the natural language of the supported language within the user query input to identify a registered capability, also provided in a natural language description formed in a primary language that may be the same or different from the language of the received user query input. Semantic similarity matching of the user query input via a query input intent value may be semantically matched to a capability, via a capability intent value, for an AI productivity tool-enableable software application 111 that may perform the action or service requested within the user query input. This may occur regardless of which supported language is used within the user query input or if it is a blended language user-query input. Use of such a semantic similarity search in embodiments herein may have some disadvantages, however, in accuracy when one or more particular key terms in an user query input are important for identifying a responsive capability, such as a specific error code or component. Thus, in embodiments herein, the OTB AI productivity tool 150 may also conduct a term frequency-inverse document frequency (TF-IDF) search or comparison with methodologies that do not necessarily consider context within natural language, but also include advantages of TF-IDF for identifying a responsive capability for an AI productivity tool-enableable software application in embodiments herein. However, TF-IDF would not be effective when a non-primary second language is used for natural language of the user query input and a primary language is used for natural language descriptions of the gathered capabilities of AI productivity tool-enableable software applications 111 execution on the information handling system 100. Thus, the weighted semantic search score of embodiments herein may use a language-dependent hybrid weighted semantic search score in other embodiments where supported, non-primary second languages are used.

In an embodiment, the hardware processor 102 executing machine readable code instructions for the OTB AI productivity tool 150 may keyword similarity match or correlate received user queries, or user query inputs to known capabilities of one or more of the AI productivity tool-enableable software applications, such as 111, by comparing natural language descriptions of the known capabilities to the natural language text of the user query input using, for example, a TF-IDF search comparison methodology. Such keyword similarity matching may be used to weight semantic similarity matching conducted by the OTB AI productivity tool 150.

The process of operating an OTB AI productivity tool 150 to determine responsive capabilities to user query inputs in an embodiment may include gathering, either in real-time or prior to execution of the OTB AI productivity tool 150, capabilities associated with each of a plurality of AI productivity tool-enablable software applications, such as 111, and describing in natural language functionalities of each of the AI productivity tool-enablable software applications 111 that may be used when interfacing with the OTB AI productivity tool 150. To avoid requiring multiple-language natural language descriptions of the plurality of capabilities, often natural language capabilities are formed or created in a primary language when gathering the capabilities of the AI productivity tool-enableable applications 111 in a natural language capabilities database.

The hardware processor 102 executing machine readable code instructions of the OTB AI productivity tool 150 may determine capability intent values associated with natural language descriptions of the gathered capabilities for each of a plurality of AI productivity tool-enablable software applications, such as 111. In an embodiment, these natural language descriptions of gathered capabilities may be generated in a primary language, such as in the English language for example. These capability intent values are a mathematical representation of descriptors of the capability operations or services from various AI productivity tool-enablable software applications and may be represented by a mathematical value that is an embedded capability intent value in a multi-axis vector space that may be associated with a natural language description for that capability or intent. The hardware processor 102 may execute machine readable code instructions of the OTB AI productivity tool 150 to perform a cosine similarity search or comparison that compares a vectorized user query input intent value and vectorized capability intent values to determine the contextual similarity between the natural language description of the capability and the natural language user query input. Further, the OTB AI productivity tool 150 may perform a query-to-intent embedding of the received user query input in any of a plurality of supported languages into a vectorized query intent value that is a mathematical representation as a vectorized mathematical value that is an embedded query intent value in a multi-axis vector space. User query input may be embedded from plural different supported languages to the same or similar vectorized query intent value in embodiments herein. In an embodiment, the OTB AI productivity tool 150 may perform a cosine similarity search for semantic similarity correlation of user query inputs in a plurality of supported languages that have been embedded into a query intent value that is. This semantic similarity correlation for query intent values may be performed for several of the capability intent values to identify a capability intent value that most closely matches or correlates with the user query input value. In such a way, the hardware processor 102 executing code instructions for the OTB AI productivity tool 150 may take relevance and context of natural language within a user query input into account when determining a matching or correlating capability of an AI productivity tool enableable software application 111 that is most likely to address the user's intent within the user query input.

In another embodiment, in order to increase the accuracy of the above-described semantic search or comparison results, such as the cosine semantic similarity algorithm, the hardware processor 102 executing machine readable code instructions for the OTB AI productivity tool 150 in an embodiment may, for each compared user query input and natural language capability, also perform a TF-IDF comparison. The output of the semantic search comparison may then be weighted by the TF-IDF comparison for each natural language capability compared to the user query input, via the hardware processor 102 executing machine readable code instructions of OTB AI productivity tool 150. The natural language capability for an AI productivity tool enableable software application 111 having the highest weighted score may then be identified, via execution of machine readable code instructions of the OTB AI productivity tool 150 by the hardware processor 102 as the capability most likely to correlate and address the user's intended query request within the natural language user query input received via the universal user conversational interface software application 170 or other user input interface. In such a way, the hardware processor 102 executing code instructions for the OTB AI productivity tool 150 may enhance semantic search performance by also considering critical keywords when determining a matching capability of an AI productivity tool enableable software application 111 that is most likely to address the user's intent within the user query input.

In some embodiments of the present disclosure, keyword comparison of a user query input natural language may be in a non-primary second language in whole or in part. This may negatively impact the benefit of weighting by the TF-IDF comparison since the natural language descriptions of the capabilities may be in a primary language causing keyword matching to be unlikely or limited. This non-primary second language user input query may be detected by the execution of code instructions of a language-dependent hybrid weighting algorithm, executing via a universal user conversational interface software application, to identify the supported language used within the user query input. The language-dependent hybrid weighting algorithm of the universal user conversational interface software determines each word of the user query input to determine if some portion of the user query input includes primary language terms, such as error codes or terms that are shared between languages. In an embodiment, with a determination of an amount, number, or percentage of primary language terms in the user query input, a determination of language-dependent hybrid weighting such that a language-dependent hybrid weighted semantic search score may be generated. In this way, the language-dependent hybrid weighted semantic search score may utilize more weighting with the lexical keyword comparison matching when applicable primary language terms appear in the user query input or the user query input is in the primary language and de-emphasize the weighting with the lexical keyword comparison matching as fewer words of the primary language are detected in the user query input in embodiments herein. Moreover, if no primary language terms appear in the user query input, no language-dependent hybrid weighting may be applied when generating the language-dependent hybrid weighted semantic search score since lexical keyword comparison matching may be ineffective. Lexical keyword comparison matching may include use of the TF-IDF keyword matching algorithm discussed in embodiments herein.

In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 141, a base station transceiver 142, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of instructions to perform one or more computer functions.

The information handling system 100 may include main memory 103, (volatile (e.g., random-access memory, etc.), or static memory 105, nonvolatile (read-only memory, flash memory etc.) or any combination thereof), one or more hardware processing resources, such as a hardware processor 102 that may be a central processing unit (CPU), embedded controller (EC) 104, a graphics processing unit (GPU) 106, other hardware controllers, or any combination thereof. Additional components of the information handling system 100 may include one or more storage devices such as static memory 105 or drive unit 120. The information handling system 100 may include or interface with one or more communications ports for communicating with external devices, as well as an input/output (IO) device 116, a video/graphics display device 115, an audio microphone 118 for recording user communications, or any combination thereof. Portions of an information handling system 100 may themselves be considered information handling systems 100.

Information handling system 100 may include devices or modules that embody one or more of the hardware devices or hardware processing resources executing machine readable code instructions for one or more software or firmware systems and modules. The information handling system 100 may execute machine readable code instructions (e.g., software or firmware algorithms), parameters, and profiles 114 that may operate on servers or systems, remote data centers, or on-box in individual client information handling systems according to various embodiments herein. In some embodiments, it is understood any or all portions of machine readable code instructions (e.g., software or firmware algorithms), parameters, and profiles 114 may operate on a plurality of information handling systems 100. In a specific embodiment, code instructions for the OTB AI productivity tool 150, the universal user conversational interface software application 170, and one or more AI productivity tool enableable software applications 111 may execute locally at the information handling system 100, or on the box.

The information handling system 100 may include the hardware processor 102 such as a central processing unit (CPU) or other hardware processing resources. Any of the hardware processing resources may operate to execute machine readable code instructions 114 that are either firmware or software code. Moreover, the information handling system 100 may include memory such as main memory 103, static memory 105, and disk drive unit 120 (volatile (e.g., random-access memory, etc.), nonvolatile memory (read-only memory, flash memory etc.) or any combination thereof or other memory with computer readable medium 112 storing machine readable code instructions (e.g., software or firmware algorithms), parameters, and profiles 114 executable by the hardware processor 102, EC 104, GPU 106, or any other hardware processing device. The information handling system 100 may also include one or more buses 117 operable to transmit communications between the various hardware components such as any combination of various I/O devices 116 as well as between hardware processors 102, an EC 104, GPU 106 or other, the operating system (OS) 111, the basic input/output system (BIOS) 110, the wireless interface adapter 130, or a radio module 132, among other components described herein. In an embodiment, the hardware processor 102, EC 104, and/or GPU 106 may execute one or more bus drivers in order to transmit this data between the information handling system 100 and the input/output devices 116 described herein. As described herein, the information handling system 100 further includes a video/graphics display device 115. The video/graphics display device 115 in an embodiment may function as a liquid crystal display (LCD), an organic light emitting diode (OLED), a flat panel display, or a solid-state display. It is appreciated that the video/graphics display device 115 may be wired or wireless and may be an external video/graphics display device 115 that allows a user to increase the desktop area by extending the desktop in an embodiment.

A network interface device of the information handling system 100 may be wired or wireless such as shown with wireless interface adapter 130 that can provide wireless connectivity among devices such as with Bluetooth® or to a network 140, e.g., a wide area network (WAN), a local area network (LAN), wireless local area network (WLAN), a wireless personal area network (WPAN), a wireless wide area network (WWAN), or other network. In embodiments described herein, the wireless interface device 130 with its radio 132, RF front end 134 and antenna 136 is used to communicate with the network 140, via, for example, a Bluetooth® or Bluetooth® Low Energy (BLE) protocols, or other WPAN or WLAN protocols.

In an embodiment, a WAN, WWAN, LAN, and WLAN may each include an AP 141 or base station 142 used to operatively couple the information handling system 100 to a network 140 via a wireless interface adapter 130. In a specific embodiment, the network 140 may include macro-cellular connections via one or more base stations 142 or a wireless AP 141 (e.g., Wi-Fi), or such as through licensed or unlicensed WWAN small cell base stations 142. Connectivity may be via wired or wireless connection. For example, wireless network wireless APs 141 or base stations 142 may be operatively connected to the information handling system 100. Wireless interface adapter 130 may include one or more RF (RF) subsystems (e.g., radio 132) with transmitter/receiver circuitry, modem circuitry, one or more antenna RF (RF) front end circuits 134, one or more wireless controller circuits, amplifiers, antennas 136 and other circuitry of the radio 132 such as one or more antenna ports used for wireless communications via multiple radio access technologies (RATs). The radio 132 may communicate with one or more wireless technology protocols.

In an embodiment, the wireless interface adapter 130 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WiMAX, WWAN such as 3GPP or 3GPP2, Bluetooth® standards, proprietary RF protocol, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax/be including Wi-Fi 6, Wi-Fi 6e, and the emerging Wi-Fi 7 standard. It is understood that any number of available channels may be available in WLAN under the 2.4 GHz, 5 GHz, or 6 GHz bands which may be shared communication frequency bands with WWAN protocols or Bluetooth® protocols in some embodiments. Wireless interface adapter 130 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both licensed and unlicensed spectrums. The wireless interface adapter 130 can represent an add-in card, wireless network interface module that is integrated with a main board of the information handling system

100 or integrated with another wireless network interface capability, or any combination thereof.

In some embodiments, hardware processor or hardware controllers executing software, firmware, or dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software machine readable code instructions executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a computer-readable medium that includes computer-readable code instructions, parameters, and profiles 114 or receives and executes instructions, parameters, and profiles 114 responsive to a propagated signal, so that a hardware device connected to a network 140 may communicate voice, video, or data over the network 140. Further, the machine readable code instructions 114 may be transmitted or received over the network 140 via the network interface device or wireless interface adapter 130.

The information handling system 100 may include a set of instructions 114 that may be executed to cause the computer system to perform any one or more of the methods or computer-based functions disclosed herein. For example, machine readable code instructions 114 may be executed by a hardware processor 102, GPU 106, EC 104 or any other hardware processing resource and may include software agents, or other aspects or components used to execute the methods and systems described herein. Various software modules comprising application machine readable code instructions 114 may be coordinated by an OS 111, and/or via an application programming interface (API) include a unified device API described herein. An example OS 111 may include Windows®, Android®, and other OS types. Example APIs may include Win 32, Core Java API, or Android APIs.

In an embodiment, the information handling system 100 may include a disk drive unit 120. The disk drive unit 120 and may include machine-readable code instructions, parameters, and profiles 114 in which one or more sets of machine-readable code instructions, parameters, and profiles 114 such as firmware or software can be embedded to be executed by the hardware processor 102 or other hardware processing devices such as a GPU 106 or EC 104, or other microcontroller unit to perform the processes described herein. Similarly, main memory 103 and static memory 105 may also contain a computer-readable medium for storage of one or more sets of machine-readable code instructions, parameters, or profiles 114 described herein. The disk drive unit 120 or static memory 105 also contain space for data storage. Further, the machine-readable code instructions, parameters, and profiles 114 may embody one or more of the methods as described herein. In a particular embodiment, the machine-readable code instructions, parameters, and profiles 114 may reside completely, or at least partially, within the main memory 103, the static memory 105, and/or within the disk drive 120 during execution by the hardware processor 102, EC 104, or GPU 106 of information handling system 100.

Main memory 103 or other memory of the embodiments described herein may contain computer-readable medium (not shown), such as RAM in an example embodiment. An example of main memory 103 includes random access memory (RAM) such as static RAM (SRAM), dynamic RAM (DRAM), non-volatile RAM (NV-RAM), or the like, read only memory (ROM), another type of memory, or a combination thereof. Static memory 105 may contain computer-readable medium (not shown), such as NOR or NAND flash memory in some example embodiments. The applications and associated APIs, for example, may be stored in static memory 105 or on the disk drive unit 120 that may include access to a machine-readable code instructions, parameters, and profiles 114 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 107 (a.k.a. a power supply unit (PSU)). The PMU 107 may include a hardware controller and executable machine-readable code instructions to manage the power provided to the components of the information handling system 100 such as the hardware processor 102 and other hardware components described herein. The PMU 107 may control power to one or more components including the one or more drive units 120, the hardware processor 102 (e.g., CPU), the EC 104, the GPU 106, a video/graphic display device 115, or other wired I/O devices 116 and other components that may require power when a user has actuated a power button. In an embodiment, the PMU 107 may monitor power levels and be electrically coupled to the information handling system 100 to provide this power. The PMU 107 may be coupled to the bus 117 to provide or receive data or machine-readable code instructions. The PMU 107 may regulate power from a power source such as the battery 108 or AC power adapter 109. In an embodiment, the battery 108 may be charged via the AC power adapter 109 and provide power to the components of the information handling system 100, via wired connections as applicable, or when AC power from the AC power adapter 109 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 105 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

When referred to as a “system,” a “device,” a “module,” a “controller,” or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
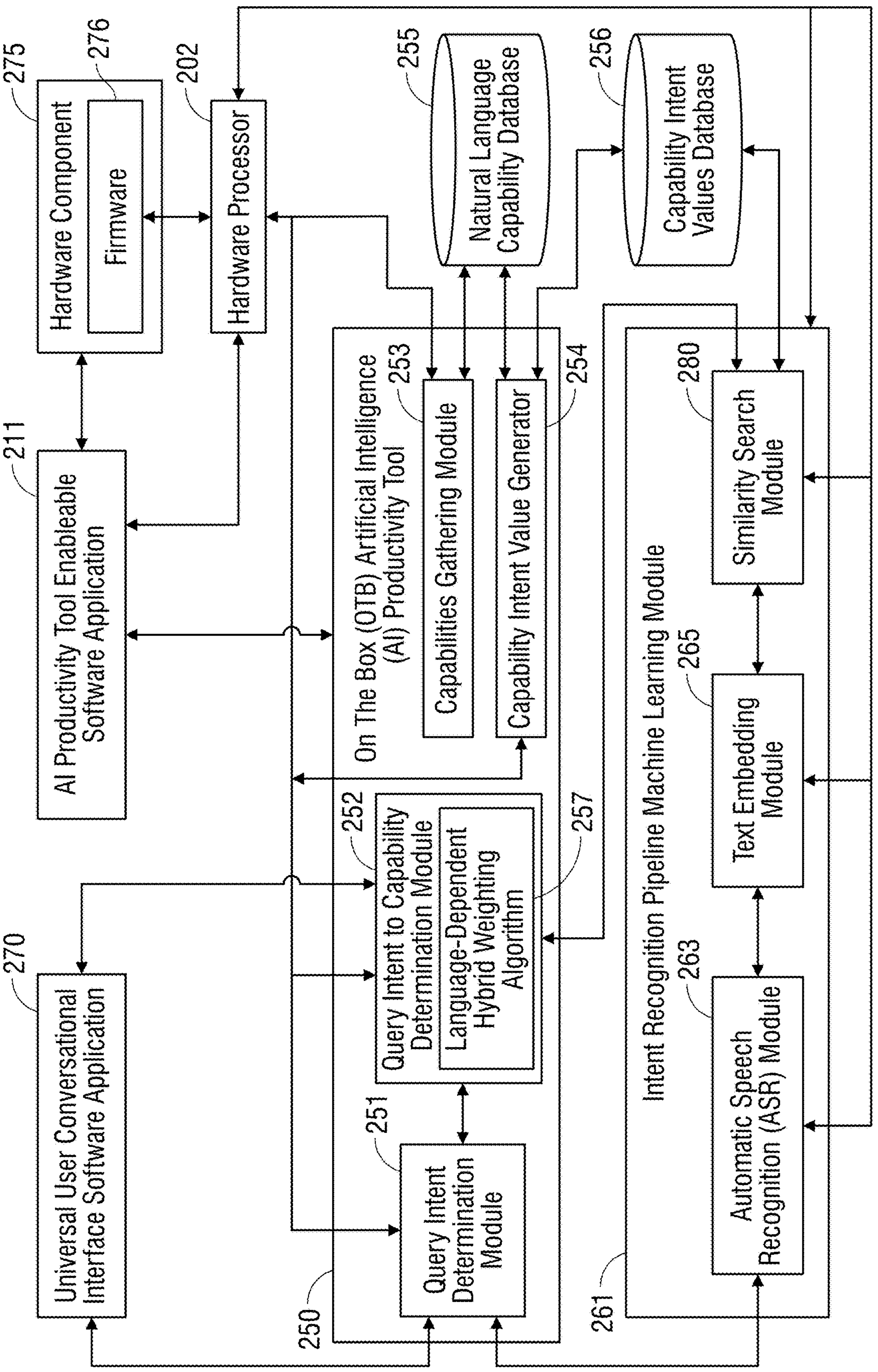
FIG. 2 is a block diagram illustrating computer readable code instructions for an OTB AI productivity tool executable on an information handling system for matching a determined query intent value for a user's query input in one of a plurality of supported languages to a registered capability intent value for an AI productivity tool-enablable software application with language-dependent hybrid weighted semantic search scoring according to an embodiment of the present disclosure.

FIG. 2 is a block diagram illustrating an on the box (OTB) artificial intelligence (AI) productivity tool for correlating a determined query intent value for a user’s query input to a registered capability intent value for an AI productivity tool-enablable software application according to an embodiment of the present disclosure. In an embodiment, the user query input may be received in one of a plurality of supported languages and embedded in the determined query input. The natural language descriptions may be formed in a primary language that may or may not be the same as some or all of the received user query input. The computer readable code instructions for an OTB AI productivity tool executable on an information handling system may conduct semantic and lexical matching between the determined query intent value for the user’s query input, in one of a plurality of supported languages, and a registered capability intent value for an AI productivity tool-enablable software application using language-dependent hybrid weighted semantic search scoring according to an embodiment of the present disclosure.

One or more AI productivity tool enableable software applications 211 in an embodiment may execute a responsive capability for operations, software services, or generating a response to meet the chatbot input query based on selection of one or more highest language-dependent hybrid weighted semantic search scores that are determined between the received user query input and capabilities of the AI productivity tool enableable software applications 211. In another embodiment, selection of the responsive capability may be made based on the capabilities determined to have language-dependent hybrid weighted semantic search score between the user input query and any of the plurality of capabilities reaching a threshold score level to invoke one or more responsive capabilities of one or more AI productivity tool-enableable software applications 211.

A manufacturer of edge devices, such as personal or enterprise computers, may develop and install on individual edge device information handling systems machine readable code instructions for an OTB AI productivity tool 250 that employs one or more locally executed machine learning models, such as 263, 265, or 267, to optimize user productivity and performance with the information handling system using artificial intelligence methodologies. Examples of artificial intelligence methodologies includes ML model algorithms used with chatbots, such as universal user conversational interface software application 270 to simulate conversations between the information handling system executing machine readable code instructions of the AI productivity tool enableable software application 211 and the user, via the OTB AI productivity tool 250 to execute one or more capabilities for an application software service, response or other function in response to a user query input. In an embodiment, universal user conversational interface software application 270 may support a plurality of languages for receiving user query inputs. In an embodiment, a response to a user query via OTB AI productivity tool 250 may trigger processes of one or more AI productivity tool enableable software applications 211 in embodiments herein and the OTB AI productivity tool 250 may respond to plural user query input languages using a system based on natural language descriptions of capabilities formed in a primary language.

The OTB AI productivity tool 250 in an embodiment may receive, via a universal user conversational interface software application 270 or other interface, a voice or text input from a user, described herein as a user query input, that requests actions or services of various software applications in natural language. That voice or text input from the user received by the universal user conversational interface software application 270 may support a plurality of languages and support blended language user input queries. A hardware processor 202 executing code instructions of the OTB AI productivity tool 250 in an embodiment may match these received user queries, or user query inputs to known capabilities of one or more of the AI productivity tool-enableable software applications 211 through execution by the hardware processor 202 of machine readable code instructions for one or more natural language processing machine learning models. AI productivity tool enableable software application 211 may have or publish a list of recognized "capabilities" or functionalities that it may perform during execution of such an AI productivity tool enableable software application 211 in response to a query input received and processed by the OTB AI productivity tool 250 into a query intent vector value. The capabilities are provided text descriptors, in a primary language, that may be processed into vectorized capability intent values in a multi-axis vector space such that these intent value mathematical representations of a query and a capability may be correlated by a similarity matching algorithm to select a capability responsive to an input query from a user.

This process includes gathering, either in real-time or prior to execution of the OTB AI productivity tool 250, via the capabilities gathering module 253, capabilities associated with each of a plurality of AI productivity tool-enablable software applications 211. These capabilities (also called capability intents and having capability intent values) may describe those functionalities of each of the AI productivity tool-enablable software applications 211, that may be used when interfacing with the OTB AI productivity tool 250. These natural language descriptions of the capabilities for the AI productivity tool-enableable software applications 211 may be formed in a single primary language, such as English, and may be stored within a natural language capability database 255 for comparison to received user query inputs, for example, in order to identify a capability most likely to address a user's request within the received user query inputs. Generating plural language descriptions for each capability may be burdensome and expensive, and also may cause variation of responsiveness or accuracy across operations of the OTB AI productivity tool 250 in different languages.

The hardware processor 202 executing machine readable code instructions for a capability intent value generator 254 of the OTB AI productivity tool 250 may determine capability intent values associated with natural language descriptions, in the primary language, of the gathered capabilities for each of a plurality of AI productivity tool-enablable software applications 211. These capability intent values are a mathematical representation of the natural language descriptions of capability operations or services from various AI productivity tool-enablable software applications 211 in an embodiment. These capability intent values may be represented by a mathematical value in a multi-axis vector space that may be associated with the natural language description for that capability or intent. As such, the generated capability intent values may now be human language agnostic. In an embodiment, the capabilities may also be associated with an identification (ID) such as an alphanumeric ID that may be stored within a capability intent values database 256. Generating such capability intent values as vectors may be a first step in a natural language processing method to determine a capability corresponding to and responsive to the user's intent or requested action within a user query input that takes into account the context or semantics of the words used within the user query input.

In an embodiment, the capability intent values database 256 may store a plurality of capabilities associated with each of a plurality of AI productivity tool-enablable software applications 211 with a name, capability ID, natural language descriptor, or a capability intent value in some embodiments. These capabilities stored at the capability intent values database 256 may include any input and output capabilities provided by the AI productivity tool-enablable software applications 211 being executed by the hardware processor 202 or any other hardware processing devices (104 or 106 of FIG. 1). For example, an AI productivity tool-enablable software application 211 may include a word processing application such as Microsoft® Word® that may receive input (e.g., via voice at a microphone 118 or text via a keyboard 116 of FIG. 1) and provide output via text. Still further, other examples of an AI productivity tool-enablable software application 211 may include an updating software, virus protection software, and setting optimization software such as Dell® SupportAssist® module executable by the hardware processor or other hardware processing resource of the information handling system. With SupportAssist® a user may provide input via, for example, the microphone (e.g., 118 of FIG. 1) requesting information related to a setting associated with the information handling system. Thus, capabilities of SupportAssist® may include virus protection capabilities, setting manipulation capabilities, and software updating capabilities that may each be stored at the capability intent values database 256.

Even further, examples of an AI productivity tool-enablable software application 211 may include Dell® Display®/Peripheral Manager®. The Dell® Display®/Peripheral Manager® may have capabilities that include optimization of screen resolution, refresh rates, and gamma correction as well as webcam settings, mouse settings, keyboard settings, stylus settings, microphone settings, and trackpad settings, among other settings and connections associated with the wired or wireless input/output devices. Again, these capabilities associated with the execution of the Dell® Display®/Peripheral Manager® software may have capability intent values and a capability identifier stored at the capability intent values database 256 as described herein. It is appreciated that the AI productivity tool-enablable software application 211 may include, for example, Dell® Trusted Device® software, a remediation Dell® APEX Managed Device Service (AMDS)® software, Alienware Command Center (AWCC)® software, among others. Some AI productivity tool-enablable software applications 211 may even be subagents operating locally on the box of the information handling system but have remote access to a larger software application executing at a cloud based server location for providing software services in some embodiments herein.

These "capabilities" may be registered with the OTB AI productivity tool 250 in an embodiment for establishing capability intent values for these capabilities such that chat user query input intent values may be correlated with one or more capability intent values for registered capabilities, as described herein. The query input intent values may be embedded as mathematical representations in vector multi-axis space from user query inputs in any supported language. The similarity matching of the user query input, in any supported language at the universal user conversational interface 270, embedded as a query intent value with a capability intent value may determine one or more responsive capability intent actions to the user query input as executed by one or more AI productivity tool-enableable software applications 211 in embodiments herein. For example, in an embodiment in which the AI productivity tool enableable software application 211 is software application for optimizing performance of hardware components at the information handling system, such capabilities may include adjusting settings or configurations for various hardware components. As another example, in an embodiment in which the AI productivity tool enableable software application 211 optimizes performance of other software applications, such capabilities may include automatically downloading and installing updates for such AI productivity tool enableable software applications 211. In yet another example, in an embodiment in which the AI productivity tool enableable software application 211 is one of several software applications routinely executing on the information handling system, and optimized by such an OTB AI productivity tool 250, such capabilities may include automatically generating and transmitting e-mails or text messages, automatically scheduling meetings, or generating chatbot or other user interface responses. These "capabilities" may be registered, associated with a specific AI productivity tool enableable software application 211, and stored with capability name, capability ID, natural language descriptor, capability intent value, or other data at the capability intent values database 256 in an embodiment.

Each of the capabilities stored at the capability intent values database 256 may have a description with text descriptors, may be associated with a unique ID, and may have a capability intent value in an embodiment. Upon registration of a given capability by the AI productivity tool enableable software application 211 in an embodiment, a hardware processor 202 for the information handling system may execute machine readable code instructions for one or more text embedding algorithms to generate a multi-dimensional vector capability intent value for that capability that, for example, may be based on text descriptors for that capability. Each of these capability intent values for association with these capabilities may also be associated with an ID such as an alphanumeric ID that may identify, uniquely, these capabilities in the capability intent values database 256, for example. These capability intent values may later be used to determine which of the capabilities a user intends to invoke or execute within a received user query input based on similarity with a query intent value, as described herein.

Upon determination of a capability intent value for each of the gathered or registered AI productivity tool enableable software application capabilities, the OTB AI productivity tool 250 may begin processing received user query inputs from the universal conversational interface software application 270 or other interface for execution of capabilities for an application software service, response or other function corresponding to one of these capability intent values. In an example embodiment, a user may provide a user query input in the form of text or voice data (e.g., via IO device 116, or microphone 118 of FIG. 1) to a universal user conversational interface software application 270 in any supported language.

The hardware processor 202 executing machine readable code instructions as a chatbot with the OTB AI productivity tool 250 may orchestrate assessment of the user's intended goals within the user query input (e.g., what the user wishes to achieve with this communication) with determination of a query input intent value using an embedding algorithm of text embedding module 265 of a query intent determination module 251. The hardware processor 202 executing machine readable code instructions of the OTB AI productivity tool 250 also identifies, via a similarity search module 280 of a query intent to capability determination module 252, one or more responsive capabilities associated with the AI productivity tool enableable software application 211 having a correlating capability intent value and that is capable of executing a response to this user query input intent, regardless of user language used. Further, the OTB AI productivity tool 250 may initiate performance of one or more tasks employing those capabilities to achieve the user-intended results to the user query input.

This orchestration in an embodiment may start with the hardware processor 202 executing machine-readable code instructions of the query intent determination module 251 to receive the user query input via microphone, image, or text input, and initiate execution of machine readable code instructions for an intent recognition pipeline machine learning module 261. As described above, the universal user conversation interface software application 270 may detect and receive the user query input via microphone, text, or video in any supported language in embodiments herein. Further, execution of computer readable code instructions of the universal user conversational interface software application 270 may determine whether some, any, or all terms in the user query input is received in a primary language recognized used for the natural language descriptions of the gathered capabilities in the natural language capability database 255. In an embodiment, the hardware processor 202 executing machine-readable code instructions for the intent recognition pipeline machine learning module 261 may further orchestrate any combination of a plurality of machine learning modules (e.g., 363, 365, or 380) to process the audio or text input to determine the user's intended goal or query intent within the received text or voice data of the user query input.

During operation, for example, the hardware processor 202 executing machine-readable code instructions of the query intent determination module 251 may load one or more machine learning models such that, for example, the text or voice input from the user may be processed through a speech recognition model 263 and/or processed through any of a plurality of natural language models (e.g., 265 or 280) or other ML models in order to determine a text of a user's input query or an intent value of the user's input query. For example, an automatic speech recognition (ASR) module 263, a text embedding module 265, or a similarity search module 280 that work in various combinations with one another to detect a user's audio speech input, conversion to text or detecting text, and detecting an intent, represented by generating a query intent vector value from the text of the user query input received from the universal user conversational interface software application 270 or other interface such as one specific to an AI productivity tool enableable software application. Further, the hardware processor 202 executing machine-readable code instructions of an intent recognition pipeline machine learning module 261 may orchestrate the interplay between each of the ASR module 263, text embedding module 265, and similarity search module 280 to establish a query intent vector value in a multi-axis vector space defined with these machine learning models and correlate that query intent value with a corresponding capability intent value in an embodiment.

Several text embedding algorithms may be used in various embodiments herein in order to provide a vectorized mathematical representation of semantic understanding for a user query input or for a capability described in natural language. For example, the text embedding module 265 may employ a Latent Semantic Analysis (LSA) or Latent Dirichlet allocation (LDA) which may define how close each of the observed terms in the received user query input are to various synonyms. As another example, the text embedding module 265 may employ a Word2Vec algorithm, which includes a neural network trained to understand which terms or phrases should be considered closer or further away from certain synonyms or antonyms. Further, the text embedding algorithms may include a plurality of text embedding modules that support each of a plurality of supported languages in embodiments herein. In one embodiment, the hardware processor 202 executing computer readable code instructions of the universal user conversational interface software application 270 may determine the language used in a received user query input and select among the text embedding modules that support embedding audio or text of the detected language into a query intent value. In yet other example embodiments, a single embedding algorithm may accept a plurality of supported languages and generate embedded query intent values for the user query input in any of those supported languages. In one embodiment, the text embedding module 265 may employ a fully recurrent neural network trained to consider the order of terms within the received user query input or the natural language descriptors of the capabilities for the AI productivity tool enableable software applications 211 and trained to accept one or a plurality of human languages as user query input for embedding as query intent values.

In an embodiment in which the user provides text data to the AI productivity tool enableable software application 211, such an intent recognition pipeline machine learning module 261 may truncate this process to exclude processes of the ASR module 263. The hardware processor 202 executing machine-readable code instructions of the intent recognition pipeline machine learning module 261 in an embodiment may apply the text embedding module 265 to generate a query intent value as described and then return the output query intent value of the text embedding module 265 to the query intent to capability determination module 252. The query intent to capability module may utilize the similarity search module 280 for a correlation between the query intent value received and a stored capability intent value. Such a similarity search module 280 in an embodiment may perform a semantic similarity search or a weighted semantic similarity search that includes a text frequency-inverse document frequency (TF-IDF) comparison between the received user query input and each of the gathered natural language capabilities stored in the natural language capabilities database 255, as described in greater detail in embodiments below.

As described in embodiments herein, in order to increase the accuracy of the above-described semantic search comparison results, such as the cosine semantic similarity algorithm, the hardware processor 202 executing machine readable code instructions for the OTB AI productivity tool 250 in an embodiment may, for each compared query intent value and plural capability intent values, perform the semantic similarity search comparison as well as perform a lexical comparison between the user query input natural language and natural language descriptions of each capability with a TF-IDF comparison. The output of the semantic search comparison may then be weighted by the TF-IDF comparison for each natural language capability compared to the user query input, via the hardware processor 202 executing machine readable code instructions of OTB AI productivity tool 250. The natural language capability for an AI productivity tool enableable software application 211 having the highest weighted score may then be identified, via execution of machine readable code instructions of the OTB AI productivity tool 150 by the hardware processor 202 as the capability most likely to correlate and address the user's intended query request within the natural language user query input received via the universal user conversational interface software application 270 or other user input interface. In such a way, the hardware processor 202 executing code instructions for the OTB AI productivity tool 250 may enhance semantic search performance by also considering critical keywords when determining a matching capability of an AI productivity tool enableable software application 211 that are most likely to address the user's intent within the user query input.

For example, the detected intent having a query intent value in a multi-axis vector space, such as "decrease display brightness," "speed up my application," or "send a text message" may be associated with a known capability or functionality of AI productivity tool enableable software application 211 at the information handling system. More specifically, the intent "decrease display brightness" may be associated with a capability for adjusting settings or configurations for a display device (115 of FIG. 1), based on similarity correlation between a query intent value and a capability intent value as determined by the similarity search module 267. This may be weighted for a higher weighted semantic similarity score with a lexical comparison between "decrease display brightness" and a capability natural language description for "display setting adjustment" or "display brightness settings" for the capability for adjusting settings or configurations for a display device. As another example, the query intent "speed up my application" may be associated with a capability associated with the AI productivity tool enableable software application 211 for automatically downloading and installing updates for such AI productivity tool enableable software application 211, based on similarity correlation between a query intent value and a capability intent value as determined by the similarity search module 267. This may be further weighted by a TF-IDF lexical comparison to the natural language description for a capability for "application updates." In yet another example, the query intent "send a text message" may be associated with a capability of the AI productivity tool enableable software application 211 to automatically generate and transmit text messages, based on similarity correlation between a query intent value and a capability intent value as determined by the similarity search module 267. This may be further weighted by a TF-IDF lexical comparison to the natural language description for a capability for "text message system." As described above, these "capabilities" may be registered and associated with a specific AI productivity tool enableable software application 211 at the capability intent value database 256 in an embodiment.

In some embodiments of the present disclosure, the user query input natural language may be in a non-primary second language, in whole or in part, such that keyword lexical comparison of the user query input to the natural language descriptions of the gathered capabilities in a primary language is negatively affected. This negative impact may negate the benefit of weighting by the TF-IDF lexical comparison for some user query inputs, but not for all user query inputs or portions of a user query input, since the natural language descriptions of the capabilities may be in a primary language causing keyword matching to be potentially limited when user query inputs are received in whole or in part in a non-primary second language. This non-primary second language user input query may be detected by the execution of code instructions of a language-dependent hybrid weighting algorithm, executing via a universal user conversational interface software application, to identify the supported language or languages of terms or words used within the user query input. The language-dependent hybrid weighting algorithm of the universal user conversational interface software determines each word of the user query input to determine if some portion of the user query input includes terms in the primary language, such as error codes or terms that are shared between human languages. For example, an error code of letters and numbers may appear across user query inputs regardless of human language used. In another example embodiment, primary language terms may be blended into the user query input. In yet another embodiment, a term may be the same across plural languages with the primary language (e.g., "hardware" in English and "hardware" in Spanish) or very similar such that some correlation to lexical matching may still occur (e.g., "battery" in English and "bateria" in Spanish).

In an embodiment, with a determination of an amount of primary language terms in the user query input, execution of computer readable code instructions of a language-dependent hybrid weighting algorithm 257 may execute as part of the query intent to capability determination module 252 a determination of language-dependent hybrid weighting such that a language-dependent hybrid weighted semantic search score may be generated. In this way, the language-dependent hybrid weighted semantic search score may utilize more weighting with the TF-IDF or other keyword matching when applicable primary language terms appear in the user query input or the user query input is in the primary language and de-emphasize the weighting with the TF-IDF or other keyword matching as fewer words of the primary language are detected in the user query input in embodiments herein. Moreover, if no primary language terms appear in the user query input, no language-dependent hybrid weighting may be applied when generating the language-dependent hybrid weighted semantic search score, effectively turning off the lexical keyword comparison weighting and relying only on semantic search scoring in those cases.

For example, the detected user query input may be "disminuir el brillo de la pantalla" with an intent having a query intent value in a multi-axis vector space that still corresponds to a mathematical representation in vector multi-axis space similar or identical to "decrease display brightness" in an embodiment. A query intent to capability determination module 252 semantically match a query intent value for this user query input with a known capability or functionality of AI productivity tool enableable software application 211 for adjusting settings or configurations for a display device (115 of FIG. 1) based on similarity correlation between a query intent value and a capability intent value as determined by the similarity search module 267. However, further weighting may not be effective for a higher accuracy with a weighted semantic similarity score, and indeed may lower such a score artificially, with a lexical comparison between "disminuir el brillo de la pantalla" and a capability natural language description for "display setting adjustment" or "display brightness settings" for the capability for adjusting settings or configurations for a display device.

As another example, the detected user query input may be "disminuir brightness de la pantalla" with an intent having a query intent value in a multi-axis vector space that still corresponds to a mathematical representation in vector multi-axis space similar or identical to "decrease display brightness" in a primary language, such as English, in an embodiment. A query intent to capability determination module 252 semantically match a query intent value for this user query input with a known capability or functionality of AI productivity tool enableable software application 211 for adjusting settings or configurations for a display device (115 of FIG. 1) based on semantic similarity correlation between a query intent value and a capability intent value as determined by the similarity search module 267. Further weighting may be partially effective in this case due to the identified term "brightness" in the primary language for a higher-accuracy weighted semantic similarity score. Thus, some partial use of lexical keyword comparison score may be used, but not fully. In some cases, the lexical score may not be effective depending on the natural language description of a capability. For example, a lexical keyword comparison between "disminuir brightness de la pantalla" and a capability natural language description for "display setting adjustment" for the capability for adjusting settings or configurations for a display device may have not additional benefit of accuracy. However, further weighting may still be effective for a higher-accuracy language dependent hybrid weighted semantic similarity score with a lexical keyword comparison between "disminuir brightness de la pantalla" and a capability natural language description for "display brightness settings" for the capability for adjusting settings or configurations for a display device.

Thus, execution of computer readable code instructions of a language-dependent hybrid weighting algorithm 257 may execute as part of the query intent to capability determination module 252 to determine the strength to be applied for language-dependent hybrid weighting of lexical TF-IDF correlation. In the above example embodiment, execution of computer readable code instructions for the language-dependent hybrid weighting algorithm 257 may identify a term or terms in a user query input that are in a primary language, such as "brightness" above. Then the language-dependent hybrid weighting algorithm 257 may identify a uniqueness level or relation of that term to hardware, software, firmware, or a function thereof and apply a keyword relevance score to the term (e.g., brightness is a function of a hardware display component). This keyword relevance score of at least one primary language term as well as the portion, percentage, or number of primary language terms in the user query input are used to determine a variable weighting factor to be applied to modify lexical keyword comparison score weighting of semantic search scores in embodiments herein. Accordingly, a language-dependent hybrid weighted semantic search score may be generated depending on the language of the user query input and an amount or level of terms in the user query input that are recognizable in a primary language, if any, when all or portions of the user query input are received in a non-primary, second language in embodiments herein. Otherwise, when a user query input is received in a primary language, full TF-IDF lexical weighting may apply to the language-dependent hybrid weighted semantic search score in determining a responsive capability in embodiments herein.

Upon identification of a capability that addresses the determined query "intent" of the user within the received user query input, the hardware processor 202 executing machine-readable code instructions of the OTB AI productivity tool 250 may direct execution of one or more processes at the AI productivity tool enableable software application 211, via the universal user conversational interface software application 270 associated with that capability. For example, the hardware processor 202 executing machine-readable code instructions of the query intent to capability determination module 252 may directly instruct the AI productivity tool enableable software application 211 to undertake the identified "capability." In such a way, the OTB AI productivity tool 250 may orchestrate a plurality of machine learning modules via an intent recognition pipeline machine learning module 261 to determine a query intent from a received user query input, and identify a corresponding vectorized capability intent value having threshold similar to the query intent value and execute a capability of the AI productivity tool enableable software application 211 to execute this capability as an operation, software service, response, or other function responsive to the user's query input.

Figure 3:
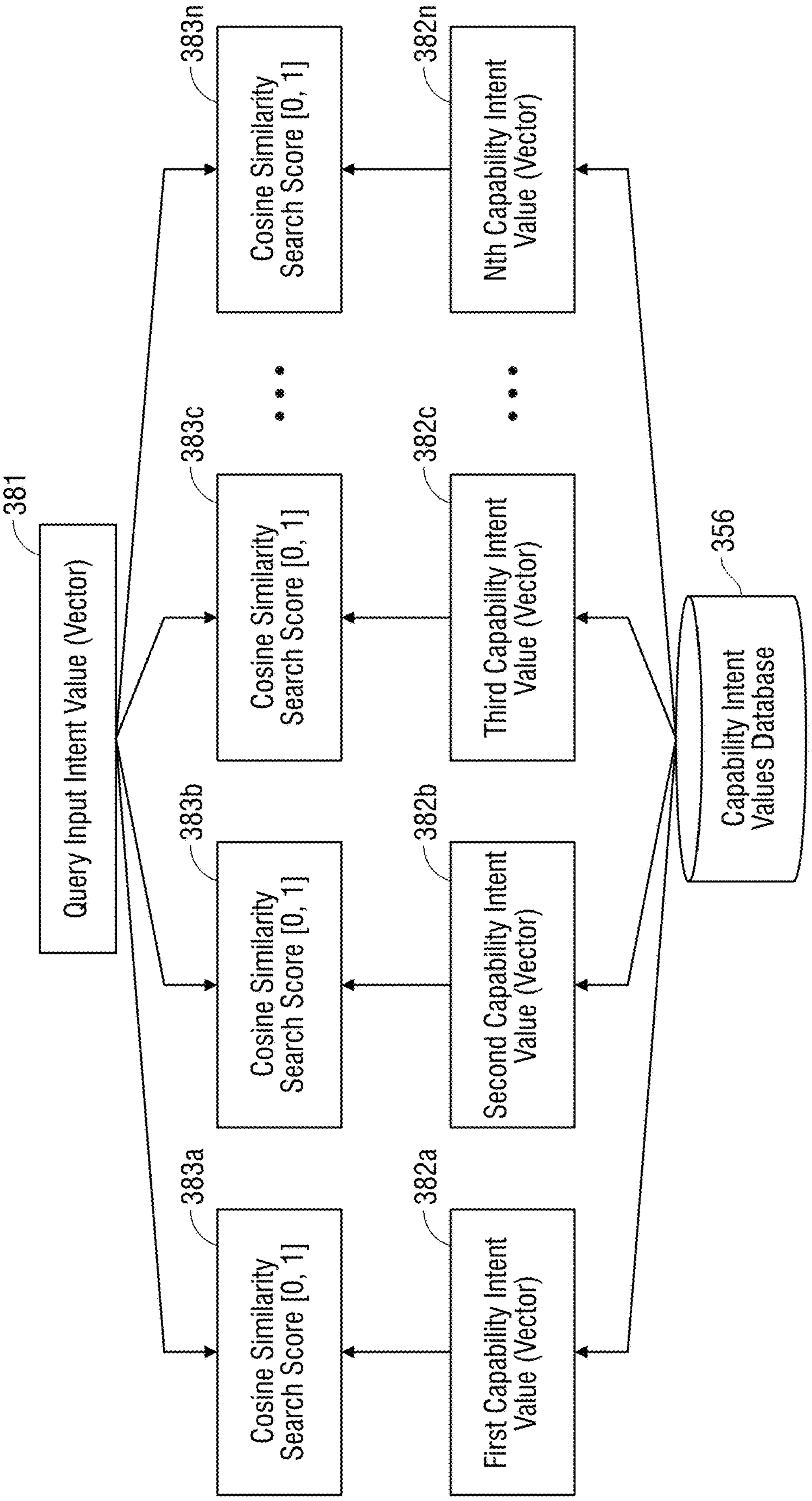
FIG. 3 is a block diagram illustrating a method of executing computer readable code instructions of modules of an OTB AI productivity tool to identify a capability that best matches a received user query input by having a capability intent value that generates a highest cosine similarity search score according to an embodiment of the present disclosure.

FIG. 3 is a block diagram illustrating a method of identifying a capability of an artificial intelligence (AI) productivity tool enableable software application that best matches a received user query input by having a capability intent value that generates a highest cosine or other semantic similarity search score during execution of a semantic search machine learning model according to an embodiment of the present disclosure. As described herein, a hardware processor may execute machine readable code instructions for a semantic similarity search machine learning model that analyzes and weighs context and relevancy. For example, in embodiments herein, a hardware processor may execute machine readable code instructions for a semantic similarity search machine learning model, via a query intent to capability module, that compares the vectorized user query input intent value 381 and the capability intent values 382*a*-382*n* stored within the capability intent values database 356. Such a comparison may be performed using a semantic search machine learning model, such as a cosine or other semantic similarity search algorithm that compares the distance or value difference in a multi-axis vector space between two vectors (e.g., 381 and each of 382*a*, 382*b*, 382*c*, to 382*n*) to determine the contextual similarity between the natural language description of the embedded text algorithm generated capabilities having the capability intent values 382*a* to 382*n* and the natural language user query input having an user query input intent value 381 generated from an embedded text algorithm. Such a contextual or semantic search methodology may take into account the fact that the same word may have two meanings or consider synonyms of words, for example based on generated intent values of multiple words or recognized phrases or parts of speech that yield the vector intent value from the text embedding algorithm machine learning models used to generate capability and query intent vector values. The cosine similarity search comparison or other semantic similarity search algorithm may be performed for several of the capability intent values (such as 382*a*, 382*b*, 382*c*, to 382*n*) stored within the capability intent value database 356 to identify a capability intent value (e.g., 382*a*) that most closely matches the user query input value 381, according to embodiments herein.

As described herein, the natural language capabilities for a plurality of AI productivity tool enableable software applications are provided text descriptors that may be processed into capability intent values, such as 381 in a multi-axis vector space, such that these intent value mathematical representations of a user query input and a capability may be correlated by a semantic similarity search to select a capability responsive to a user query input. Any number of axes for the multi-axis vector spaces may be used in various embodiments. Indeed, many capability intent value generators or other machine learning algorithms for determining capability intent vector values for natural language terms or phrases and contemplated for use in embodiments herein utilize capability intent vector values that might be plotted among plural axes well above the three axis multi-axis vector spaces. For example, multi-axis vector spaces having 500 to 700 or more axes are contemplated for use with natural language algorithms with embodiments herein.

Each axis of the multi-axis vector space may provide a measurement of various attributes of a text excerpt that are known to provide context or semantic understanding of the text. For example, a reader's understanding of a given text excerpt may depend upon the reader's knowledge of any given word's meaning within the text, identified phrases within the text, or the understood order or sequence of words within the text. More specifically, the reader's understanding is enhanced by the reader having a larger vocabulary and understanding of which words in that vocabulary are synonyms (closer in meaning) to a given word in that text, and which words are antonyms (further away in meaning) to that given word. As another example, the reader's ability to identify common phrases, such as "in other words" may provide greater insight to the semantic meaning of a text excerpt using this phrase than the reader's understanding of each of the words "in," "other," and "words" used separately from one another. As yet another example, the importance of the order of certain words in an excerpt may impact semantic meaning of the excerpt. More specifically, the phrase "man bites dog" may have a completely different semantic or contextual meaning than the phrase "dog bites man," although each phrase has the same words, just in a different order. Thus, the text embedding algorithm system's ability to incorporate values and identify common phrases of words grouped together and the importance of word order with the value of the generated vector intent value for a capability or query adds to the semantic meaning of a text excerpt using such a phrase to distinguish the semantic meaning in the generated vector intent value. Thus, the semantic similarity machine learning model algorithm may more accurately identify similarities of unique query intent values with capability intent values in embodiments herein.

Each axis of the multi-axis vector space, and thus, each value within a vector within such a multi-axis vector space may provide a measurement of these various attributes within a given intent value in embodiments herein. For example, a vector for a user query input intent value or for capability intent value may provide a measurement of similarity between any given word within the user query input or AI productivity tool enablable software application capabilities, respectively, a measurement of dissimilarity with known antonyms, identification of any given word as part of a phrase, or usage of any given word in a specific order that is known to be of importance. In such a way, the vectorized user query input intent value and capability intent values may mathematically represent a reader's contextual or semantic understanding of the user query input and the natural language descriptors for the capabilities of the AI productivity tool enableable software applications. These vectors may then be compared to one another in order to understand, not only which individual words are used and their frequencies (as determined through TF-IDF comparison), but also how alike various phrases within the user query input and capabilities are, and how alike the usage of those words and phrases are to provide a context, such as influenced by the order of those words or phrases and their relation to one another.

Several text embedding algorithms may be used in various embodiments herein in order to provide such a mathematical representation of semantic understanding. For example, the text embedding module (265 of FIG. 2) may employ a Latent Semantic Analysis (LSA) or Latent Dirichlet allocation (LDA) which may define how close each of the observed terms in the received user query input are to various synonyms. As another example, the text embedding module (265 of FIG. 2) may employ a Word2Vec algorithm, which includes a neural network trained to understand which terms or phrases should be considered closer or further away from certain synonyms or antonyms. As yet another example, the text embedding module (265 of FIG. 2) may employ a fully recurrent neural network trained to consider the order of terms within the received user query input or the natural language descriptors of the capabilities for the AI productivity tool enableable software applications.

A hardware processor executing machine readable code instructions for a semantic search machine learning model of the similarity search module (e.g., 280 of FIG. 2) may determine a distance, that is a value difference of the vector intent values within the multi-axis vector space between the query input intent value 381 and each of a plurality of capability intent values 382*a* to 382*n*. Then, for each of those determined distances, the hardware processor executing machine readable code instructions for a semantic search machine learning model of the similarity search module (e.g., 280 of FIG. 2) may determine an angular similarity having a value between zero and one for the query input intent value 381 and each of a plurality of capability intent values 382*a* to 382*n*. This angular similarity value in an embodiment may comprise the cosine similarity search score (e.g., 382*a*, 383*b*, 383*c* to 383*n*) for a given capability intent value (e.g., 382*a*, 382*b*, 382*c* to 382*n*, respectively), where zero is a worst match and one is a best match between the given capability intent value (e.g., 382*a*, 382*b*, 382*c* to 382*n*) and the query input intent value 381. In such a way, a hardware processor executing code instructions for the query intent to capability module for the OTB AI productivity tool may take relevance and context of natural language within a user query input into account when determining a matching capability of an AI productivity tool enableable software application that is most likely to address the user's intent within the user query input in some embodiments.

Figure 4:
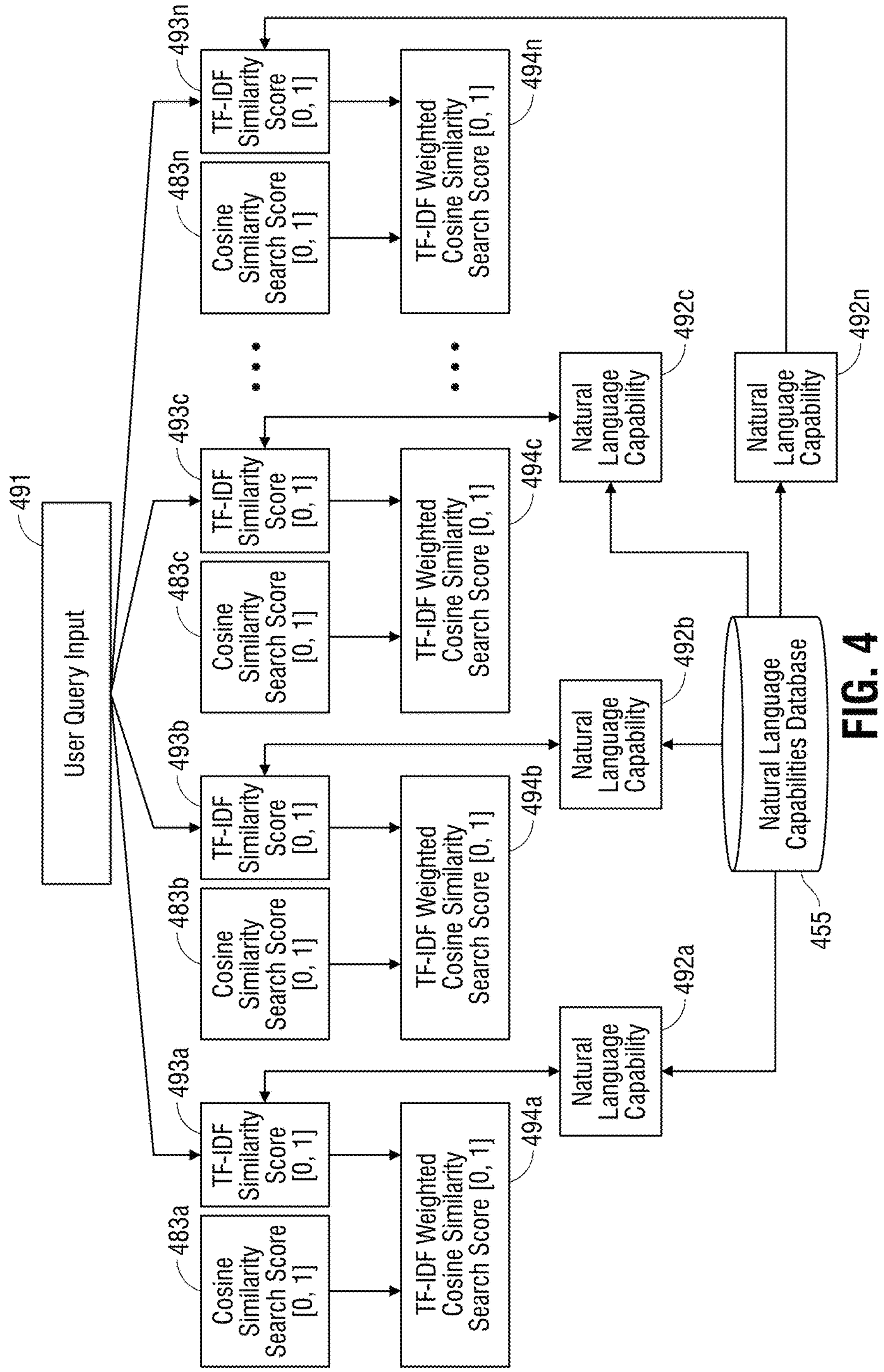
FIG. 4 is a block diagram illustrating a method of executing computer readable code instructions of modules of an OTB AI productivity tool to identify a capability that best matches a received user query input by weighting a semantic similarity search score by a text frequency-inverse document frequency (TF-IDF) similarity search score according to an embodiment of the present disclosure.

FIG. 4 is a block diagram illustrating a method of identifying capability of an artificial intelligence (AI) productivity tool enableable software application that best matches a received user query input by weighting a semantic similarity search score by a text frequency-inverse document frequency similarity search score according to an embodiment of the present disclosure. In a further embodiment described with respect to FIGS. 5 and 7 below, a language-dependent hybrid weighting of a semantic similarity search score may be adjusted by execution of a language dependent hybrid weighting algorithm depending on a type of language detected in a user query input well as in portions of the user query input received. As described in the embodiment of FIG. 4 however, while semantic search methodologies, such as that described above with respect to FIG. 3 are better-suited than TF-IDF methodologies alone for use with natural language text excerpts for context accuracy, such as with query intent values of the user query input 491 and the capability intent values of natural language descriptions of capabilities 492*a* through 492*n*, TF-IDF methodologies are better-suited than semantic search methodologies where a single keyword within the user query input 491 is important to identifying a matching capability from its natural language description (e.g., 492*a*, 492*b*, 492*c*, up to 492*n*) for an AI productivity tool-enableable software application to address the user's concerns.

For example, a user may provide a natural language user query input 491 such as "resolve error code 0xc0000142." In such a scenario the semantic search methodologies described above with respect to FIG. 3 may identify that an error code needs to be resolved, but it may not focus heavily on the term "0xc0000142," which may be important or determinative in finding the right capability (e.g., 492*a*, 492*b*, 492*c*, or 492*n*) from a natural language capabilities database 455 for an AI productivity tool enableable software application to resolve the error code. In such a case, it may be useful to also perform a TF-IDF comparison for the user query input 491 across the stored natural language descriptions of the capabilities (e.g., 492*a*, 492*b*, 492*c* to 492*n*) within the natural language capabilities database 455 to identify the capability (e.g., 492*c*) that best addresses the specific term "0xc0000142."

As described herein, in order to increase the accuracy of the cosine or other semantic similarity search scores, such as 383*a* to 383*n* of FIG. 3 above in determining when a capability for an AI productivity tool enableable software application may address the user's request within a received user query input, the hardware processor executing machine readable code instructions for the query intent to capability determination module of the OTB AI productivity tool in an embodiment may, for each compared user query input 491 and natural language capability 492*a* to 492*n*, perform a TF-IDF comparison. For example, as shown in FIG. 4, and as part of the similarity search described above with reference to FIG. 3, the hardware processor executing machine readable code instructions for the similarity search module may determine the cosine or other semantic similarity search score 483*a* describing a degree of similarity between the query input intent value (381 of FIG. 3) for the user query input 491 and the capability intent value (382*a* of FIG. 3) for a natural language description of a capability 492*a* stored within the natural language capabilities database 455. As another example, the hardware processor executing machine readable code instructions for the similarity search module may determine the cosine or other semantic similarity search score 483*b* describing a degree of similarity between the query input intent value (381 of FIG. 3) for the user query input 491 and the capability intent value (382*b* of FIG. 3) for a natural language description of a capability 492*b* stored within the natural language capabilities database 455. In yet another example, the hardware processor executing machine readable code instructions for the similarity search module may determine the cosine or other semantic similarity search score 483*c* describing a degree of similarity between the query input intent value (381 of FIG. 3) for the user query input 491 and the capability intent value (382*c* of FIG. 3) for a natural language description of a capability 492*c* stored within the natural language capabilities database 455. This may be repeated for each of the natural language capabilities (e.g., up to 492*n*) stored within the natural language capabilities database 455, to produce a cosine or other semantic similarity search score of 483*n*.

In an embodiment, each of these cosine similarity search scores 482*a* to 482*n* may then be weighted by a TF-IDF keyword comparison similarity score (e.g., 493*a* to 493*n*, respectively), in order to increase the accuracy of the cosine similarity or other semantic search scores 483*a* to 483*n* in determining when a capability (e.g., 492*a* to 492*n*) for an AI productivity tool enableable software application may address the user's request within the received user query input 491. For example, the hardware processor executing code instructions for the similarity search module (280 of FIG. 2) may perform a TF-IDF algorithm to measure the frequency with which each of a plurality of natural language terms appear within the user query input 491, as weighted by the frequency with which that term occurs in one of each of the natural language capabilities 492*a* to 492*n* stored within the natural language capabilities database 455. More specifically, the hardware processor executing code instructions for a TF-IDF algorithm may determine a TF-IDF keyword comparison similarity score 493*a* measuring the frequency with which each of a plurality of natural language terms, including "0xc0000142" appear in the user query input 491, as weighted by the frequency with which each of those terms also occur within the natural language capability 492*a*. As another example, the hardware processor executing code instructions for a TF-IDF algorithm may determine a TF-IDF keyword comparison similarity score 493*b* measuring the frequency with which each of a plurality of natural language terms, including "0xc0000142" appear in the user query input 491, as weighted by the frequency with which each of those terms occur within the natural language capability 492*b*. In yet another example, the hardware processor executing code instructions for a TF-IDF algorithm may determine a TF-IDF keyword comparison similarity score 493*c* measuring the frequency with which each of a plurality of natural language terms, including "0xc0000142" appear in the user query input 491, as weighted by the frequency with which each of those terms occur within the natural language capability 492*c*. This may be repeated for each of the natural language capabilities (e.g., up to 492*n*) stored within the natural language capabilities database 455, to produce a TF-IDF keyword comparison similarity score of 493*n*. Each TF-IDF keyword comparison similarity score determined in such a way may have a value between zero and one. Thus, if there is a TF-IDF match of a term such as "0xc0000142" with that term in a capability natural language description, the capability will have an increased weighting for a match over other capabilities that do not contain this term in embodiments herein. It is contemplated that any number of known or later-developed TF-IDF comparison algorithms may be used, including the best-match 25 (BM25) algorithm, the Okapi BM25 algorithm, and the BM-25 with fields (BM-25F).

Each of the cosine or other semantic similarity search scores 483*a* to 483*n* output of the semantic search comparison is weighted by one of the TF-IDF keyword comparison similarity scores 493*a* to 493*n*, respectively, for each natural language capability 492*a* to 492*n*, respectively, that is compared to the user query input 491, via the hardware processor executing machine readable code instructions of the query intent to capability determination module. For example, the cosine or other semantic similarity search scores 483*a* to 483*n* may be multiplied by the TF-IDF keyword comparison similarity scores 493*a* to 493*n*, respectively in an embodiment. In another example embodiment, a TF-IDF weighted cosine or other semantic similarity search score 494*a* may be determined by a hardware processor executing code instructions of the query intent to capability determination module as equivalent to one plus the cosine or other semantic similarity search score 483*a*, multiplied by one plus the TF-IDF keyword comparison similarity score 493*a*. In still another example embodiment, a TF-IDF weighted cosine or other semantic similarity search score 494*b* may be determined by a hardware processor executing code instructions of the query intent to capability determination module as equivalent to one plus the cosine or other semantic similarity search score 483*b*, multiplied by one plus the TF-IDF keyword comparison similarity score 493*b*. In yet another example embodiment, a TF-IDF weighted cosine or other semantic similarity search score 494*c* may be determined by a hardware processor executing code instructions of the query intent to capability determination module as equivalent to one plus the cosine or other semantic similarity search score 483*c*, multiplied by one plus the TF-IDF keyword comparison similarity score 493*c*. This may be repeated for each of the natural language capabilities (e.g., up to 492*n*) stored within the natural language capabilities database 455, to produce a TF-IDF weighted or other semantic cosine similarity search score of 494*n*.

The natural language capability (e.g., 492*c* that may include the keyword "0xc0000142") for an AI productivity tool enableable software application having the highest TF-IDF weighted cosine or other semantic similarity search score may then be identified, via execution of machine readable code instructions of the query intent to capability determination module by the hardware processor, as the capability (e.g., 492*c*) most likely to address the user's intended request within the natural language user query input 491. In such a way, the hardware processor executing code instructions for the query intent to capability module for the OTB AI productivity tool may enhance semantic search performance by also considering critical keywords when determining a matching capability of an AI productivity tool enableable software application that is most likely to address the user's intent within the user query input.

Figure 5:
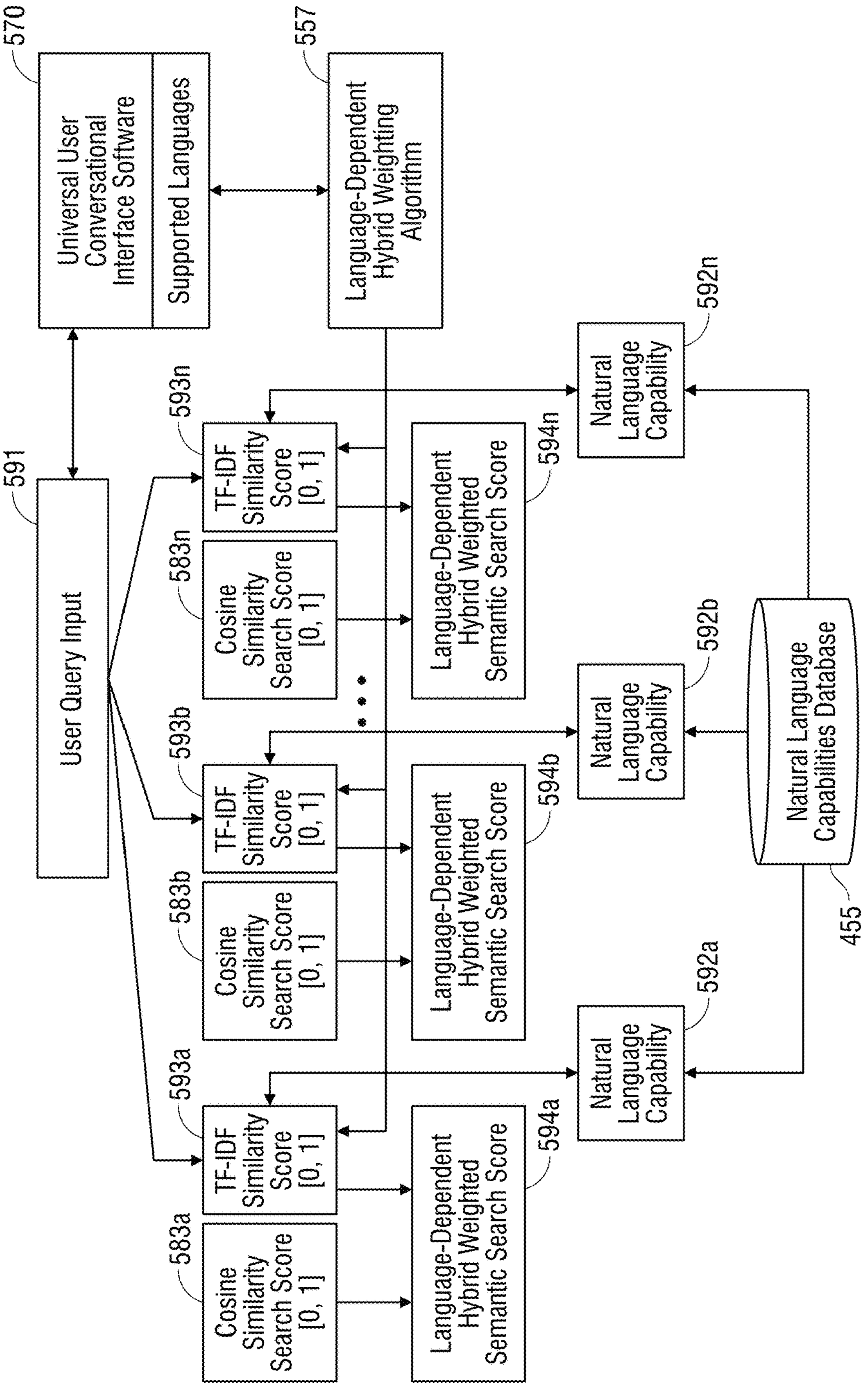
FIG. 5 is a block diagram illustrating a method of executing computer readable code instructions of modules of an OTB AI productivity tool to identify a capability that best matches a received user query input in one of a plurality of supported languages by hybrid weighting a semantic similarity search score by a text frequency-inverse document frequency (TF-IDF) similarity search that provides a language-dependent hybrid weighted semantic search score according to an embodiment of the present disclosure.

FIG. 5 is a block diagram illustrating a method of identifying one or more capabilities of artificial intelligence (AI) productivity tool enableable software applications that best match a received user query input by weighting a semantic similarity search score by a text frequency-inverse document frequency (TF-IDF) keyword comparison search score using language-dependent hybrid weighting according to an embodiment of the present disclosure. In a further embodiment described herein, execution of computer readable code instructions of a language dependent hybrid weighting algorithm 557 operating in a query intent to capability determination module 552 may apply variable weighting levels of language-dependent hybrid weighting, via a variable weighting factor, to the lexical TF-IDF keyword comparison score between the user query intent 491 and a plurality of capabilities (e.g., 592*a*, 592*b*, . . . 592*n*). The language dependent hybrid weighting algorithm 557 may generate this variable weighting factor to variably apply TF-IDF weighting to generate one or more language-dependent hybrid weighted semantic search scores 594*a*, 594*b*, . . . 594*n* for similarity matching with one or more capabilities described with natural language descriptions 592*a*, 592*b*, . . . 592*n* in embodiments herein.

The variable weighting levels applied by the language dependent hybrid weighting algorithm 557 are adjusted depending on type of language in which a user query input is received or what portion of the user query input is in a primary language that is also used with the capability natural language descriptions 592*a*, 592*b*, . . . 592*n*. Further, keyword relevance scores are assigned to identified terms or words in the primary language within the user query input in embodiments herein. Since the AI productivity tool of embodiments herein may become somewhat large as more capabilities are added to the natural language capabilities database 555, having multiple language versions of capability natural language descriptions 592*a*, 592*b*, . . . 592*n* may become quite large and this may vastly increase the required similarity search in response to user input queries. User query inputs may include supported non-primary second language terms as well as primary language terms, all non-primary second language terms, or all primary language terms in various embodiments herein.

As described in embodiments of the present disclosure, while semantic search methodologies, such as that described above with respect to FIG. 3 are better-suited than TF-IDF methodologies alone for use with natural language text excerpts for context accuracy, such as with query intent values of the user query input 591 and the capability intent values of natural language descriptions of capabilities 592*a* through 592*n*, TF-IDF methodologies or other lexical comparison methodologies are better-suited than semantic search methodologies where a single keyword within the user query input 591 is important. The lexical TF-IDF methodologies use particular keyword matching to identify a matching capability from its natural language description (e.g., 592*a*, 592*b*, up to 592*n*) for an AI productivity tool-enableable software application to address the user's concerns and are effected when such keyword or keywords are important to the accuracy of the response. The keyword matching may not be entirely necessary and, thus, TF-IDF weighting provides added accuracy whereas semantic cosine matching may still provide for identification of responsive capabilities. Therefore, in some embodiments, the user query input, containing terms from plural supported languages, may be used in receiving user query inputs. Variable weighting levels may be applied to lexical (e.g., TF-IDF) keyword comparison scores by the language dependent hybrid weighting algorithm 557 and adjusted with a variable weighting factor that depends on type of language in which a user query input is received, what portion of the user query input is in a primary language relative to other portions in a second language, and keyword relevance scoring for identified terms in the primary language in order to take advantage of increased accuracy of lexical (e.g., TF-IDF) keyword weighting if keywords in the primary language are available in the received user query input.

For example, a user may provide a natural language user query input 591 such as "risolvere il codici di errore 0xc0000142." In such a scenario the semantic search methodologies described above with respect to FIG. 3 may identify that an error code needs to be resolved, but it may not focus heavily on the term "0xc0000142," which may be important or determinative in finding the right capability (e.g., 592*a*, 592*b*, or 592*n*) responsive to this query input. In such an example embodiment, weighting with keyword matching with natural language descriptions 594*a*, 594*b*, and 594*n* of available capabilities in a natural language capabilities database 555 for AI productivity tool enableable software applications will effectively improve accuracy of the AI productivity tool in responding to the user query input to resolve the error code.

In an embodiment, a hardware processor executing computer readable code instructions of a universal user conversational interface software application 570 may receive the user query input 591 and determine that its terms are in a blend of one or more supported languages. Further, execution of a text embedding module of the query intent determination module of the AI productivity tool may embed the user query input 591 in a vectorized query intent value similar to a query intent value for the English version of "resolve error code 0xc0000142." However, as described, semantic comparison of these vector intent values for the query to capabilities may be limited due to the specific nature of the error code recited. In such a case, it may be useful to also perform a TF-IDF or other lexical keyword comparison for the user query input 591 across the stored natural language descriptions of the capabilities (e.g., 592*a*, 592*b*, to 592*n*) within the natural language capabilities database 555 to identify the capability that best addresses the specific term "0xc0000142."

As described herein, in order to increase the accuracy of the cosine or other semantic similarity search scores, such as 383*a* to 383*n* of FIG. 3 above, in determining when a capability for an AI productivity tool enableable software application may address the user's request within a received user query input, the hardware processor executing machine readable code instructions for the query intent to capability determination module of the OTB AI productivity tool in an embodiment may, for each compared pair user query input 591 and natural language capability 592*a* to 592*n*, perform a TF-IDF or other lexical keyword comparison in addition to the cosine or other semantic similarity search score 583*a* describing a degree of similarity between the query input intent value (381 of FIG. 3) for the user query input 591 and the capability intent value (382*a* of FIG. 3). The TF-IDF or other lexical keyword comparison score determines a keyword correlation for a natural language description of a capability 592*a* stored within the natural language capabilities database 555. As another example, the hardware processor executing machine readable code instructions for the similarity search module may determine the cosine or other semantic similarity search score 583*b* describing a degree of similarity between the query input intent value (381 of FIG. 3) for the user query input 591 and the capability intent value (382*b* of FIG. 3) for a natural language description of a capability 592*b* stored within the natural language capabilities database 555. The TF-IDF or other lexical keyword comparison score determines a keyword correlation for a natural language description of a capability 592*b* stored within the natural language capabilities database 555.

This may be repeated for each of the natural language capabilities (e.g., up to 592*n*) stored within the natural language capabilities database 555, to produce a cosine or other semantic similarity search score of 583*n*. Similarly, the TF-IDF or other lexical keyword comparison score determines a keyword correlation for the natural language descriptions of a capabilities up to 592*n* stored within the natural language capabilities database 555. However, the user query input 591 has been received, in a large portion, in a non-primary, second language (e.g., Italian) that is different from the primary language used with the natural language descriptions 592*a*, 592*b*, and 592*n* (e.g., English) of capabilities in the AI productivity tool.

The execution of the universal user conversational interface software 570 may determine both that the second language (e.g., Italian) is a supported language and invoke execution of computer readable code instructions of a language dependent hybrid weighting algorithm 557 to analyze the terms in the user query input. The hardware processor executing code instructions of the language dependent hybrid weighting algorithm 557 may determine the number of words or percentage of the user query input that occurs in the primary language in an embodiment. Further, the hardware processor executing code instructions of the language dependent hybrid weighting algorithm 557 may determine an importance or uniqueness score to any words detected in the user query input that occur in the primary language as a keyword relevance score in an embodiment. In the example embodiment, one word or about 15 percent of the user query input 591 for "risolvere il codici di errore 0xc0000142" comprises the primary language term "0xc0000142." However, the single word "0xc0000142" in the user query input 591 is a unique word with high keyword relevance.

Detected terms in a primary language in the user query input may be categorized by the language dependent hybrid weighting algorithm 557 into a set of relevance categories. For example, highly unique or component, software, or firmware function descriptive terms, such as “0xc0000142” or “display” may be in a first high relevance category. Common or non-unique words, such as “the” or prepositions, may be a bottom or lowest relevance category. Then one or more middle-level relevance categories may be used for other words, such as “function,” “operation,” “extend,” or the like. Each of these keyword relevance categories may be associated with a baseline level or range of variable weighting factor values by the language dependent hybrid weighting algorithm 557. For example, the word “0xc0000142” may be determined to be in a high relevance category and determined to have a variable weighting factor no lower that 0.7 for values ranging from 0 to 1. Any minimum variable weighting factor value may be applied to the high relevance category or to the other categories in various embodiments. For example, one or more middle-level relevance categories may have a minimum variable weighting factor score of 0.5 or some other value and tweaked for responsiveness. A lowest level keyword relevance category may have no minimum variable weighting factor score or a lower minimum value in other embodiments. Accordingly, the language dependent hybrid weighting algorithm 557 assigns variable levels of weighting to the language dependent hybrid weighted semantic search scores 594*a*, 594*b*, and 594*n* that result from semantic comparison with lexical weighting between the user query input 591 and plural capabilities having intent values and natural language descriptions 594*a*, 594*b*, and 594*n* in embodiments herein.

In an embodiment, each of these cosine similarity search scores 582*a* to 582*n* may then be weighted by a TF-IDF keyword comparison similarity score 593*a* to 593*n*, respectively, at various levels of weighting determined by the language dependent hybrid weighting algorithm 557, in order to increase the accuracy of the cosine similarity or other semantic search scores 583*a* to 583*n* in determining a responsive capability (e.g., 592*a* to 592*n*) for an AI productivity tool enableable software application. The determination of the TF-IDF keyword comparison similarity score may occur according to embodiments herein such that the similarity search module (280 of FIG. 2) may perform a TF-IDF algorithm to measure the frequency with which each of a plurality of natural language terms appear within the user query input 591, as weighted by the frequency with which that term occurs in one of each of the natural language capabilities 592*a* to 592*n* stored within the natural language capabilities database 555.

The variable weighting factor, for example between 0 and 1, determined by execution of the language dependent hybrid weighting algorithm 557 is dependent on several factors including number of words or percentage of the user query input that occurs in the primary language as well as an importance or uniqueness keyword relevance score category for any words detected in the user query input that occur in the primary language as a keyword relevance score impacting a minimum variable weighting factor value in an embodiment. For example, if the entire user query input 591 is received in a primary language with at least one term that has a high keyword relevance score, the variable weighting factor of 1 would be applied to the TF-IDF keyword comparison similarity score 593*a* to 593*n* respectively for full weighting to be applied with the lexical TF-IDF keyword comparison similarity score 593*a* to 593*n* to generate the TF-IDF weighted cosine similarity search scores such as 494*a* to 494*n* as described in the embodiment of FIG. 4 above. However, when a portion of the user query input 591 contains only a percentage of terms in the primary language that may reduce the variable weighting factor below 1 from the language dependent hybrid weighting algorithm 557. For example, 15% of the user query input 591 for “risolvere il codici de errore 0xc0000142” may include a primary language term. Thus, the variable weighting factor 0.15 may be used. However, the single word “0xc0000142” in the user query input 591 is a unique word with a high keyword relevance score category, and accordingly, may require that the variable weighting factor be above 0.75 in an embodiment. This minimum variable weighting factor of 0.75 may be in addition to the 0.15 for the portion of words in the primary language to yield a variable weighting factor of 0.9 in another embodiment. In yet other embodiments, the number or percentage of primary language words or the keyword relevance score may be set along with keyword relevance score categories for one or more user query input terms, via a table or other data construct, to yield various variable weighting factors between 0 and 1. Finally, if the user query input 591 contains no primary language terms, and thus no terms with high keyword relevance, the variable weighting factor from the language dependent hybrid weighting algorithm 557 would be 0, effectively turning off any weighting from the TF-IDF keyword comparison similarity scores 593*a* to 593*n*.

More specifically, the hardware processor executing code instructions for a TF-IDF algorithm may determine a TF-IDF keyword comparison similarity score 593*a* measuring the frequency with which each of a plurality of natural language terms, including “0xc0000142” appear in the user query input 591, as weighted by the frequency with which each of those terms also occur within the natural language capability 592*a*. This TF-IDF keyword comparison score weighting may be further modified by the variable weighting factor described above, such as 0.9, as applied in the non-primary second language user query input, “risolvere il codici di errore 0xc0000142.” As another example, the hardware processor executing code instructions for a TF-IDF algorithm may determine a TF-IDF keyword comparison similarity score 593*b* measuring the frequency with which each of a plurality of natural language terms, including “0xc0000142” appear in the user query input 591, as weighted by the frequency with which each of those terms occur within the natural language capability 592*b*. This TF-IDF weighting may be further modified by the variable weighting factor determined via execution of the language dependent hybrid weighting algorithm 557 as described above. In yet another example, the hardware processor executing code instructions for a TF-IDF algorithm may determine a TF-IDF keyword comparison similarity score 593*n* measuring the frequency with which each of a plurality of natural language terms, including “0xc0000142” appear in the user query input 591, as weighted by the frequency with which each of those terms occur within the natural language capability 592*n*. Again, each TF-IDF keyword comparison similarity score weighting may be further modified by the variable weighting factor determined via execution of the language dependent hybrid weighting algorithm 557 as described above. This may be repeated for each of the natural language capabilities stored within the natural language capabilities database 555, to produce a language-dependent hybrid weighting score 594*a* to 594*n* for each capability.

In an example embodiment, each language-dependent hybrid weighting score 594*a* to 594*n* determined, in such a way, may also have a value between zero and one as the modified TF-IDF keyword comparison similarity score 593*a* to 593*n* weighting is applied to the semantic search scores 583*a* to 583*n*. Thus, if there is a TF-IDF match of a term such as "0xc0000142" in a user query input matching that term with one in a natural language description of a capability (e.g., 592*a*, 592*b*, or 592*n*), that capability will have an increased weighting for a match over other capabilities that do not contain this term in embodiments herein. It is contemplated that any number of known or later-developed TF-IDF comparison algorithms may be used, including the best-match 25 (BM25) algorithm, the Okapi BM25 algorithm, and the BM-25 with fields (BM-25F).

Each of the cosine or other semantic similarity search scores 583*a* to 583*n* output of the semantic search comparison is weighted by one of the TF-IDF keyword comparison similarity scores 593*a* to 593*n*, as modified by the variable weighting factor determined via execution of the language dependent hybrid weighting algorithm 557 as described above. In this way, a language dependent hybrid weighted semantic search score 594*a*-594*n* by the variable weighting factor determined via execution of the language dependent hybrid weighting algorithm 557 for similarity comparison each natural language capability 592*a* to 592*n* to the user query input 591, regardless of the language used, via the hardware processor executing machine readable code instructions of the query intent to capability determination module.

For example, the cosine or other semantic similarity search scores 583*a* to 583*n* may be multiplied by the TF-IDF keyword comparison similarity scores 593*a* to 593*n*, respectively, in an embodiment. However, each of the TF-IDF keyword comparison similarity scores 593*a* to 593*n* are modified by multiplying the variable weighting factor determined via execution of the language dependent hybrid weighting algorithm 557 in an embodiment. In another example embodiment, a language-dependent hybrid weighted semantic search score 594*a* may be determined by a hardware processor executing code instructions of the query intent to capability determination module as equivalent to one plus the cosine semantic similarity search score 583*a*, multiplied by one plus the modified TF-IDF keyword comparison similarity score 593*a* as modified by the variable weighting factor determined via execution of the language dependent hybrid weighting algorithm 557. In still another example embodiment, a language-dependent hybrid weighted semantic search score 594*b* may be determined by a hardware processor executing code instructions of the query intent to capability determination module as equivalent to one plus the cosine semantic similarity search score 583*b*, multiplied by one plus the modified TF-IDF keyword comparison similarity score 593*b* as modified by the variable weighting factor determined via execution of the language dependent hybrid weighting algorithm 557. This may be repeated for each of the natural language capabilities (e.g., up to 592*n*) stored within the natural language capabilities database 555, to produce the language-dependent hybrid weighted semantic search scores 594*a* to 594*n* for each available capability which is described in primary language (e.g., English) natural language descriptions.

The natural language capability (e.g., 592*b* that may include the keyword "0xc0000142") for an AI productivity tool enableable software application having the highest language-dependent hybrid weighted semantic search score or scores (e.g., 594*b*) among 594*a* to 594*n* may then be identified, via execution of machine readable code instructions of the query intent to capability determination module by the hardware processor, as the one or more capabilities most likely to address the user's intended request within the natural language user query input 591. This system may accommodate any supported languages or any blend thereof in user query inputs. In such a way, the hardware processor executing code instructions for the query intent to capability module for the OTB AI productivity tool may still enhance semantic search performance in blended non-primary language user query inputs by also considering critical keywords when determining a matching capability of an AI productivity tool enableable software application that is most likely to address the user's intent within the user query input.

Figure 6:
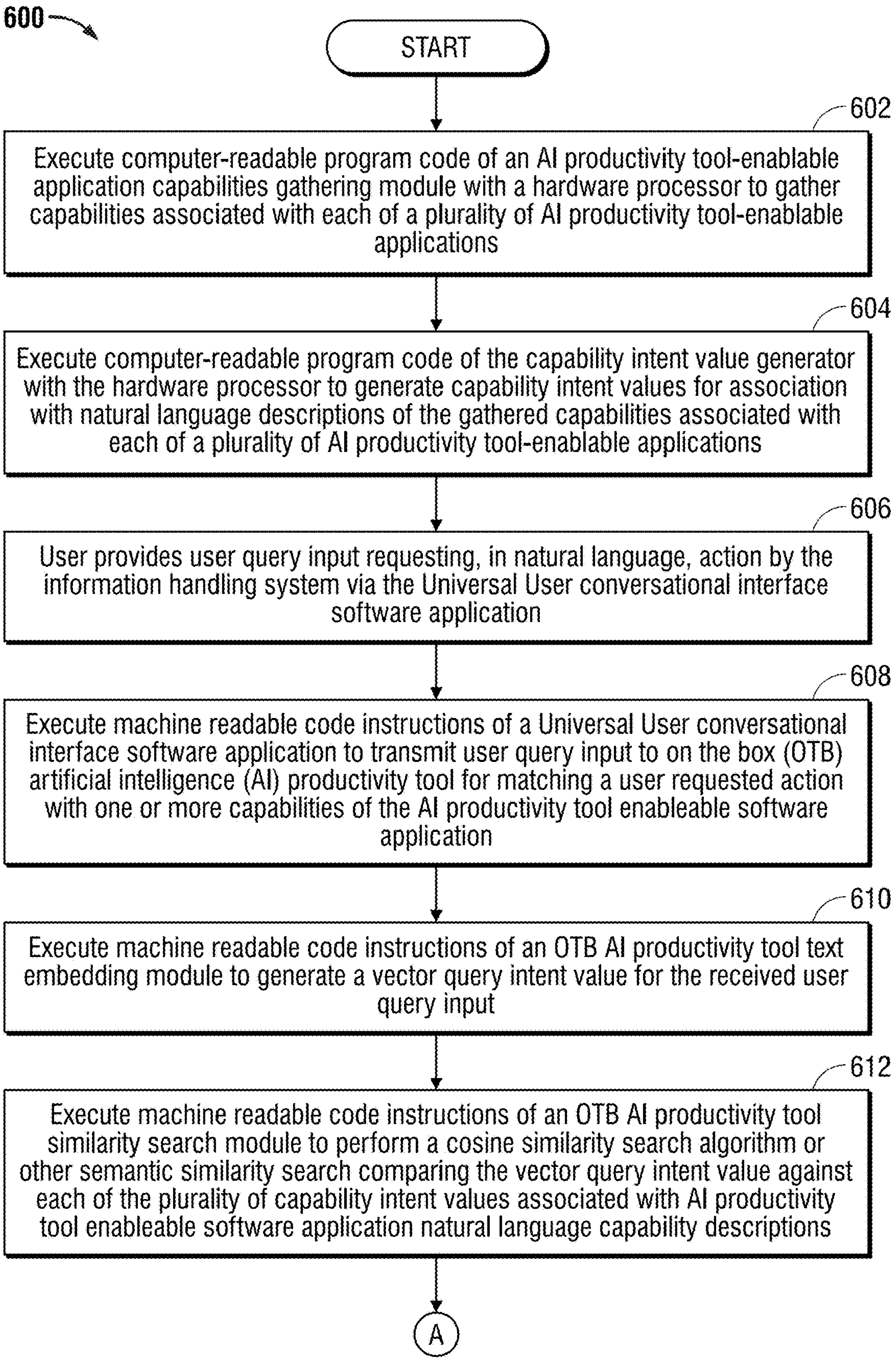
FIG. 6 is a flowchart showing a method of executing computer readable code instructions of modules of an OTB AI productivity tool to identify a capability that best matches a received user query input through a TF-IDF weighted semantic search that considers context of terms as well as keywords within the user query input according to an embodiment of the present disclosure.
Figure 6:
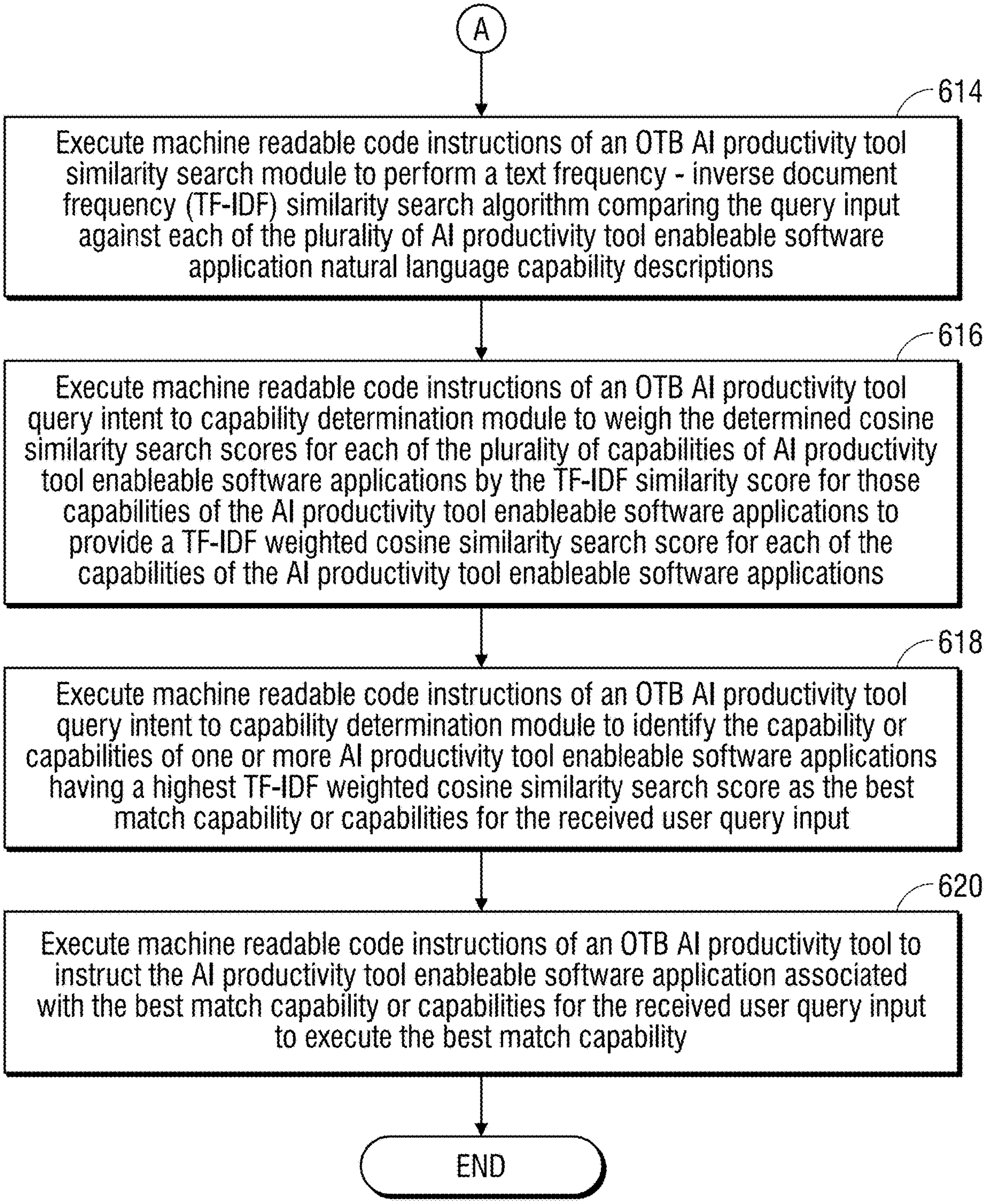

FIG. 6 is a flowchart 600 showing a method of identifying a capability of an artificial intelligence (AI) productivity tool enableable software application that best matches a received user query input through a text frequency-inverse document frequency (TF-IDF) weighted semantic search that considers context of terms as well as keywords within the user query input according to an embodiment of the present disclosure. It is appreciated that the method 600 described herein may be executed via execution of computer readable program code instructions in firmware or software by a hardware processor or other hardware processing device on an information handling system.

The method 600 may include, at block 602, executing computer-readable program code instructions of a capabilities gathering module via a hardware processor, hardware controller or other hardware processing resource to gather capabilities associated with each of a plurality of AI productivity tool-enablable software applications. These capabilities gathered by The capabilities gathering module may include any input and output capabilities provided by the AI productivity tool-enablable software applications being executed or to be executed by the hardware processor or any other hardware processing devices of an information handling system. For example, an AI productivity tool-enablable software application may include a word processing application such as Microsoft® Word® that may receive input (e.g., via voice at a microphone or text via a keyboard) and provide output via text. Still further, other examples of an AI productivity tool-enablable software application may include a software updating system, virus protection software, and setting optimization software such as Dell® SupportAssist® module that are code instructions executable by the hardware processor or other hardware processing resource of the information handling system. With SupportAssist®, a user may provide input via, for example, the microphone requesting information related to a setting associated with the information handling system. Thus, capabilities of SupportAssist® may include virus protection capabilities, setting manipulation capabilities, and software updating capabilities that may each be detected and gathered via the execution of the capabilities gathering module for use and categorization of these capabilities as described herein.

Even further, examples of an AI productivity tool-enablable software application may include Dell® Display®/Peripheral Manager®. The Dell® Display®/Peripheral Manager® may be computer-readable program code instructions that have capabilities that include optimization of screen resolution, refresh rates, and gamma correction as well as webcam settings, mouse settings, keyboard settings, stylus settings, microphone settings, and trackpad settings, among other settings and connections associated with the wired or wireless input/output devices. Again, these capabilities associated with the execution of the Dell® Display®/Peripheral Manager® subagent may be gathered by the capabilities gathering module for later determination of capability vector intent values and categorization as described herein. It is appreciated that any AI productivity tool-enablable software application of computer-readable program code instructions in software, firmware, or some combination that may publish or provide a listing of capabilities to be gathered by the capabilities gathering module. For example, each AI productivity tool-enablable software application publish or have assigned to it one or more descriptor terms or phrases for capabilities of the AI productivity tool-enablable software application for use with an OTB AI productivity tool, such as for with a chatbot natural language system. Further examples of AI productivity tool-enablable applications may include, for example, Dell® Trusted Device® application, a remediation Dell® APEX Managed Device Service (AMDS)® AI productivity tool-enablable software application, Alienware Command Center (AWCC)® AI productivity tool-enablable software application, among others. The capabilities of each of these AI productivity tool-enablable software applications, including descriptors associated with those capabilities, may be gathered via execution, by the hardware processor or any other hardware processing device, of the capabilities gathering module.

At block 604, the method 600 includes an information handling system hardware processor, hardware controller, or other hardware processing resource executing computer-readable program code of the capability intent value generator to generate capability intent values with execution of a text embedding machine learning model for association with the natural language descriptions or descriptors for those gathered capabilities associated with each of a plurality of AI productivity tool-enablable software applications. Execution of computer-readable program code of the capability intent value generator may cause the specific words, sets of words, phrases, or order of word usage associated with the natural language descriptors of capabilities of each of the AI productivity tool-enablable software applications described herein to be used to generate vectorized capability intent values for those capabilities. For example, a capability intent value for association with the natural language description of the various capabilities associated with the Dell® SupportAssist® may include descriptors such as "virus protection," "updating," "update," "settings," "settings optimization," and the like that describe these capabilities. Similar or other descriptors may be associated with a plurality of other capabilities for additional AI productivity tool-enablable software applications in embodiments herein. Each of these capability intent vector values for association with the natural language descriptions of these capabilities and their capability intent vector values may also be associated with a capability ID such as an alphanumeric ID that may identify, uniquely, these capabilities for storage in a database for example or for publication, storage, and use with embodiments herein.

As a specific example, the hardware processor executing machine readable code instructions for a capability intent value generator of the OTB AI productivity tool may determine capability intent values associated with natural language descriptions of the gathered capabilities for each of a plurality of AI productivity tool-enablable software applications. Such natural language descriptions of the gathered capabilities may include keywords that are best recognized by TF-IDF comparisons, such as words not having known synonyms. For example, such a keyword may include a specific alpha-numeric coding for an error code.

The capability intent values are a mathematical representation of the natural language descriptions of capability operations or services from various AI productivity tool-enablable software applications in an embodiment. These capability intent values may be represented by a mathematical value in a multi-axis vector space that may be associated with the natural language description for that capability or intent. In an embodiment, the capabilities may also be associated with an identification (ID) such as an alphanumeric ID that may be stored within a capability intent values database. These capabilities stored at the capability intent values database may include any input and output capabilities provided by the AI productivity tool-enablable software applications being executed by the hardware processor or any other hardware processing devices.

At block 606, a user in an embodiment may provide a user query input requesting, in natural language, an action or response by the information handling system via the universal user conversational interface software application or other interface (e.g., specific for an AI productivity tool enableable software application). For example, a user may provide text or voice data (e.g., via IO device 116, or microphone 118 of FIG. 1) to a universal user conversational interface, operating as a chatbot to simulate a conversation between the user and any of several AI productivity tool enableable software applications.

The hardware processor in an embodiment at block 608 may execute machine readable code instructions of a universal user conversational interface software application or other interface to transmit the user query input to the OTB AI productivity tool for matching a user requested action in a user query input with natural language capabilities of the AI productivity tool enableable software application. For example, in an embodiment described at FIG. 2, once the capabilities have been gathered (e.g., at block 602) at natural language capabilities database 255, the hardware processor 202 executing machine readable code instructions of the OTB AI productivity tool 250 in an embodiment may receive a user query input, via the universal user conversational interface software application 270 or other interface requesting that an action be taken at the information handling system. The OTB AI productivity tool 250 may later use machine-learning methodologies to determine a capability stored at the natural language capability database 255 for an AI productivity tool enableable software application 211, that can address the request in the user query input, as described further below.

At block 610, the hardware processor in an embodiment may execute machine readable code instructions of an OTB AI productivity tool text embedding module to generate a vector query intent value for the received user query input. For example, in an embodiment in which the user provides a user query input in the form of voice data to the AI productivity tool enableable software application 211 via the OTB AI productivity tool 250 and the universal software application conversation interface 270, the hardware processor 202 executing machine-readable code instructions of an automated speech recognition (ASR) module 263 to detect words within the recorded voice data. The hardware processor 202 may also execute machine readable code instructions of a text embedding module 265 to detect which of these words are nouns, verbs, or commonly used sentence structures and generate a vectorized query input intent value for the user query input.

As also described in an example embodiment with respect to FIG. 3, the natural language capabilities for a plurality of AI productivity tool enableable software applications are provided text descriptors that may be processed into capability intent values, such as 381 in a multi-axis vector space, such that these intent value mathematical representations of a user query input and a capability may be correlated by a semantic similarity search to select a capability responsive to a user query input. Any number of axes for the multi-axis vector spaces may be used in various embodiments. Indeed, many capability intent value generators or other machine learning algorithms for determining capability intent vector values for natural language terms or phrases and contemplated for use in embodiments herein utilize capability intent vector values that might be plotted among plural axes well above the three axis multi-axis vector spaces. For example, multi-axis vector spaces having 500 to 700 or more axes are contemplated for use with natural language algorithms with embodiments herein.

Each axis of the multi-axis vector space may provide a measurement of various attributes of a text excerpt that are known to provide context or semantic understanding of the text. For example, a reader's understanding of a given text excerpt may depend upon the reader's knowledge of any given word's meaning within the text, identified phrases within the text, or the understood order or sequence of words within the text. More specifically, the reader's understanding is enhanced by the reader having a larger vocabulary and understanding of which words in that vocabulary are synonyms (closer in meaning) to a given word in that text, and which words are antonyms (further away in meaning) to that given word. Thus, the text embedding algorithm system's ability to incorporate values and identify common phrases of words grouped together and the importance of word order with the value of the generated vector intent value for a capability or query adds to the semantic meaning of a text excerpt using such a phrase to distinguish the semantic meaning in the generated vector intent value. Thus, the semantic similarity machine learning model algorithm may more accurately identify similarities of unique query intent values with capability intent values in embodiments herein.

Each axis of the multi-axis vector space, and thus, each value within a vector within such a multi-axis vector space may provide a measurement of these various attributes within a given intent value in embodiments herein. For example, a vector for a user query input intent value or for capability intent value may provide a measurement of similarity between any given word within the user query input or AI productivity tool enablable software application capabilities, respectively, a measurement of dissimilarity with known antonyms, identification of any given word as part of a phrase, or usage of any given word in a specific order that is known to be of importance. In such a way, the vectorized user query input intent value and capability intent values may mathematically represent a reader's contextual or semantic understanding of the user query input and the natural language descriptors for the capabilities of the AI productivity tool enableable software applications. These vectors may then be compared to one another in order to understand, not only which individual words are used and their frequencies (as determined through TF-IDF comparison), but also how alike various phrases within the user query input and capabilities are, and how alike the usage of those words and phrases are to provide a context, such as influenced by the order of those words or phrases and their relation to one another.

Several text embedding algorithms may be used in various embodiments herein in order to provide such a mathematical representation of semantic understanding. For example, the text embedding module (265 of FIG. 2) may employ a Latent Semantic Analysis (LSA) or Latent Dirichlet allocation (LDA) which may define how close each of the observed terms in the received user query input are to various synonyms. As another example, the text embedding module (265 of FIG. 2) may employ a Word2Vec algorithm, which includes a neural network trained to understand which terms or phrases should be considered closer or further away from certain synonyms or antonyms. As yet another example, the text embedding module (265 of FIG. 2) may employ a fully recurrent neural network trained to consider the order of terms within the received user query input or the natural language descriptors of the capabilities for the AI productivity tool enableable software applications.

A hardware processor in an embodiment at block 612 may execute machine readable code instructions of an OTB AI productivity tool similarity search module to execute machine readable code instructions to perform a cosine similarity search algorithm comparing the vector query intent value against each of the plurality of capability intent values associated with AI productivity tool enableable software application natural language capability descriptions. For example, a hardware processor may execute machine readable code instructions for a semantic similarity search machine learning model, via executing machine readable code instructions of a query intent to capability module, that compares the vectorized user query input intent value 381 and the capability intent values 382*a*-382*n* stored within the capability intent values database 356. Such a comparison may be performed using a semantic search machine learning model, such as a cosine similarity search algorithm that compares the distance or vector value differences in a multi-axis vector space between two vectors (e.g., 381 and each of 382*a*, 382*b*, 382*c*, to 382*n*) to determine the contextual similarity between the natural language description of the capabilities having the capability intent values 382*a* to 382*n* and the natural language user query input having the user query input intent value 381. This may be performed for several of the capability intent values (such as 382*a*, 382*b*, 382*c*, to 382*n*) stored within the capability intent value database 356 to identify a capability intent value (e.g., 382*a*) that most closely matches the user query input value 381.

A hardware processor executing machine readable code instructions for a semantic search machine learning model of the similarity search module (e.g., 280 of FIG. 2) may determine a distance between the query input intent value 381 and each of a plurality of capability intent values 382*a* to 382*n*. Then, for each of those determined distances, the hardware processor executing machine readable code instructions for a semantic search machine learning model of the similarity search module (e.g., 280 of FIG. 2) may determine an angular similarity having a value between zero and one for the query input intent value 381 and each of a plurality of capability intent values 382*a* to 382*n*. This angular similarity value in an embodiment may comprise the cosine similarity search score (e.g., 383*a*, 383*b*, 383*c* to 383*n*) for a given capability intent value (e.g., 382*a*, 382*b*, 382*c* to 382*n*, respectively), where zero is a worst match and one is a best match between the given capability intent value (e.g., 382*a*, 382*b*, 382*c* to 382*n*) and the query input intent value 381. In such a way, a hardware processor executing code instructions for the query intent to capability module for the OTB AI productivity tool may take relevance and context of natural language within a user query input into account when determining a matching capability of an AI productivity tool enableable software application that is most likely to address the user's intent within the user query input.

At block 614, in some embodiments, the hardware processor may execute machine readable code instructions of an OTB AI productivity tool similarity search module to perform a TF-IDF similarity search algorithm comparing the query input terms in natural language text against each of the plurality of AI productivity tool enableable software application natural language capability descriptions. For example, in an embodiment described with reference to FIGS. 2 and 4, the hardware processor executing code instructions for the similarity search module 280 may perform a TF-IDF algorithm to measure the frequency with which each of a plurality of natural language terms appear within the user query input 491, as weighted by the frequency with which that term occurs in one of each of the natural language descriptions of capabilities 492*a* to 492*n* stored within the natural language capabilities database 455. More specifically, the hardware processor executing code instructions for a TF-IDF algorithm may determine a TF-IDF keyword comparison similarity score 493*a* measuring the frequency with which each of a plurality of natural language terms, including unique terms having no known synonyms, such as "0xc0000142" for example, appear in the user query input 491, as weighted by the frequency with which each of those terms occur within the natural language description of the capability 492*a*. As another example, the hardware processor executing code instructions for a TF-IDF algorithm may determine a TF-IDF keyword comparison similarity score 493*b* measuring the frequency with which each of a plurality of natural language terms, including "0xc0000142" for example, appear in the user query input 491, as weighted by the frequency with which each of those terms occur within the natural language description of the capability 492*b*. In yet another example, the hardware processor executing code instructions for a TF-IDF algorithm may determine a TF-IDF keyword comparison similarity score 493*c* measuring the frequency with which each of a plurality of natural language terms, including "0xc0000142" for example, appear in the user query input 491, as weighted by the frequency with which each of those terms occur within the natural language description of the capability 492*c*. This may be repeated for each of the natural language descriptions of the capabilities (e.g., up to 492*n*) stored within the natural language capabilities database 455, to produce a TF-IDF keyword comparison similarity score of 493*n*.

The hardware processor in an embodiment at block 616 may execute machine readable code instructions of an OTB AI productivity tool query intent to capability determination module to weigh the determined cosine or other semantic similarity search scores for each of the plurality of AI productivity tool enableable software application natural language capability descriptions by the TF-IDF keyword comparison similarity score for that AI productivity tool enableable software application natural language capability description, to provide a TF-IDF weighted cosine or other semantic similarity search score for each of the AI productivity tool enableable software application natural language capability descriptions. For example, the cosine or other semantic similarity search scores 483*a* to 483*n* may be multiplied by the TF-IDF keyword comparison similarity scores 493*a* to 493*n*, respectively in an embodiment. In another example embodiment, a TF-IDF weighted or other semantic cosine similarity search score 494*a* may be determined by a hardware processor executing code instructions of the query intent to capability determination module as equivalent to one plus the cosine or other semantic similarity search score 483*a*, multiplied by one plus the TF-IDF keyword comparison similarity score 493*a*. In still another example embodiment, a TF-IDF weighted or other semantic cosine similarity search score 494*b* may be determined by a hardware processor executing code instructions of the query intent to capability determination module as equivalent to one plus the cosine or other semantic similarity search score 483*b*, multiplied by one plus the TF-IDF keyword comparison similarity score 493*b*. In yet another example embodiment, a TF-IDF weighted cosine or other semantic similarity search score 494*c* may be determined by a hardware processor executing code instructions of the query intent to capability determination module as equivalent to one plus the cosine or other semantic similarity search score 483*c*, multiplied by one plus the TF-IDF keyword comparison similarity score 493*c*. This may be repeated for each of the natural language capabilities (e.g., up to 492*n*) stored within the natural language capabilities database 455, to produce a TF-IDF weighted cosine or other semantic similarity search score of 494*n*.

At block 618, a hardware processor may execute machine readable code instructions of an OTB AI productivity tool query intent to capability determination module to identify the AI productivity tool enableable software application natural language capability having a highest TF-IDF weighted cosine or other semantic similarity search score as the best match capability for the received user query input. For example, the natural language capability (e.g., 492*c* that includes the keyword "0xc0000142" in one example) for an AI productivity tool enableable software application having the highest TF-IDF weighted cosine or other semantic similarity search score may be identified, via execution of machine readable code instructions of the query intent to capability determination module by the hardware processor as the capability (e.g., 492*c*), that is most likely to address the user's intended request within the natural language user query input 491. In such a way, the hardware processor executing code instructions for the query intent to capability module for the OTB AI productivity tool may enhance semantic search performance by also considering critical keywords when determining a matching capability of an AI productivity tool enableable software application that is most likely to address the user's intent within the user query input.

The hardware processor in an embodiment at block 620 may execute machine readable code instructions of an OTB AI productivity tool to instruct the AI productivity tool enableable software application associated with the best match capability for the received user query input to execute the best match capability. Further the hardware processor will execute code instructions of the one or more AI productivity tool enableable software applications to execute a responsive capability intent action corresponding to the best match capability or capabilities. For example, in an embodiment, the hardware processor executing machine readable code instructions of the OTB AI productivity tool determines that the best match capability is the capability 493*c*, which includes the keyword "0xc0000142," and is associated with the AI productivity tool enableable software application 211 of FIG. 2. In such an embodiment, the hardware processor may execute machine readable code instructions of the OTB AI productivity tool to instruct the AI productivity tool enableable software application 211 to execute the capability 493*c*.

Thus, the hardware processor of the information handling system may respond to a user input query with an artificial intelligence responsive action to execute machine readable code instructions the AI productivity tool enableable software application associated with the best match capability for the received user query input to execute the best match capability. For example, the hardware processor 202 may execute machine readable code instructions the AI productivity tool enableable software application 211 associated with the best match capability 493*c* for the received user query input to execute the best match capability 493*c*. The method for identifying a capability of an AI productivity tool enableable software application that best matches a received user query input through a TF-IDF weighted semantic search that considers context of terms as well as keywords within the user query input may then end.

Figure 7:
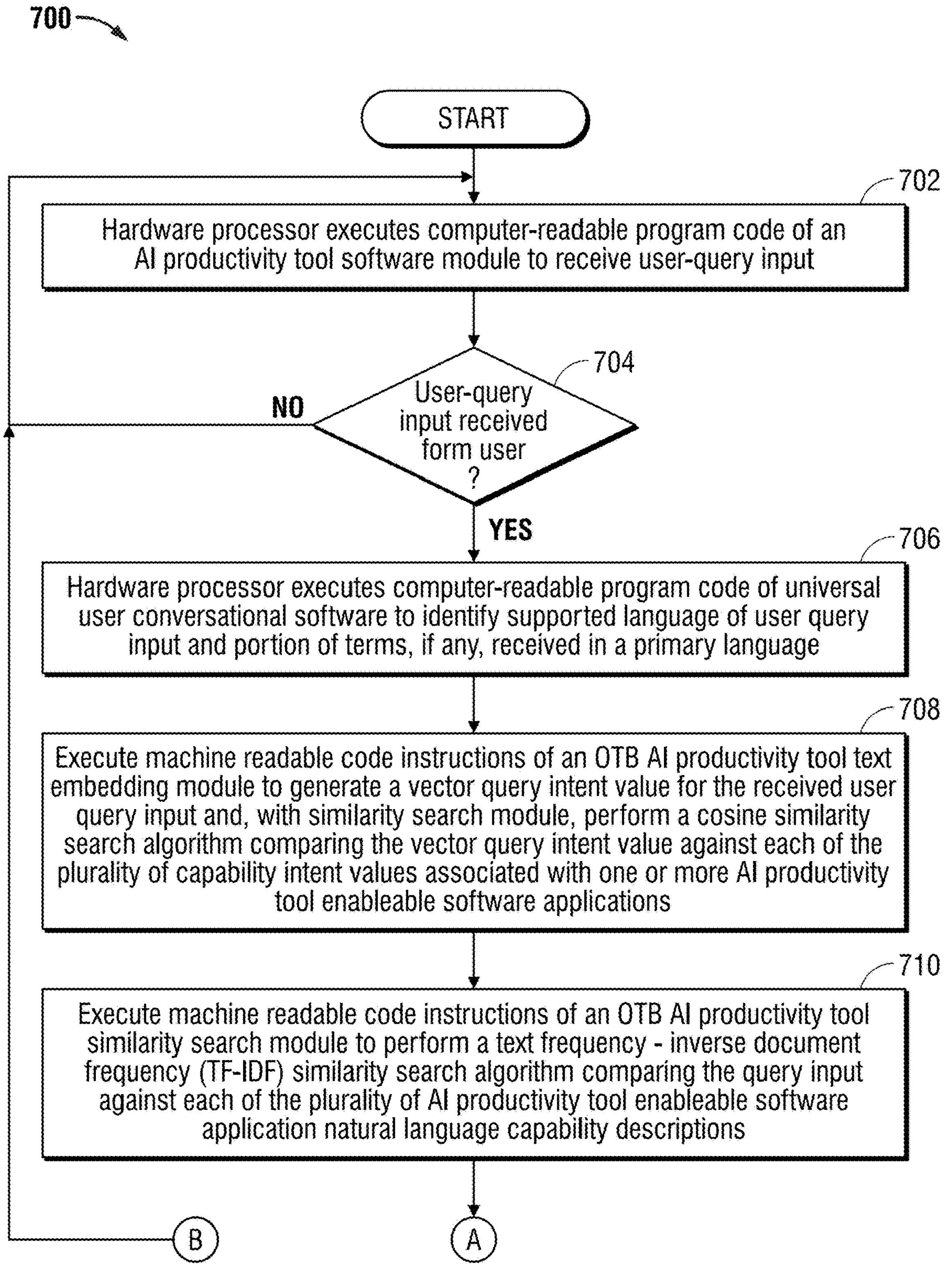
FIG. 7 is a flowchart showing a method of executing computer readable code instructions of modules of an OTB AI productivity tool to identify a capability that best matches a received user query input through a language-dependent hybrid weighted semantic search score that considers, language used, context of terms, and primary language keywords within the user query input according to an embodiment of the present disclosure.
Figure 7:
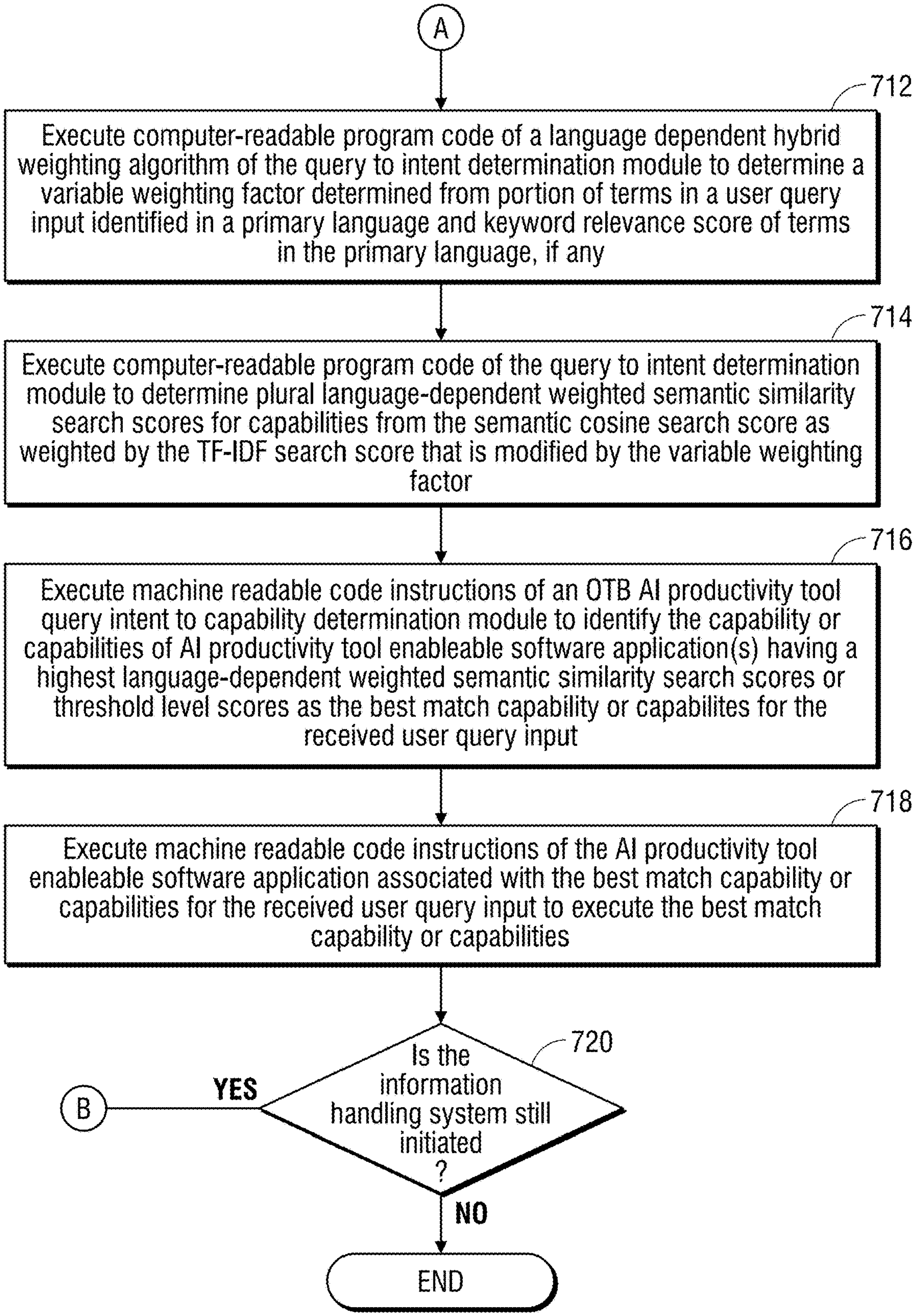

FIG. 7 is a flow diagram showing a method 700 of executing code instructions of detecting an AI productivity tool to determine a portion of a primary language in a received user-query input and identify a matched, responsive capability associated with one or more AI productivity tool-enablable software applications using language dependent hybrid weighted semantic search scoring according to an embodiment of the present disclosure. Similar to the embodiment of FIG. 6, the method of FIG. 7 may be executed on an information handling system similar to the information handling systems described in FIG. 1. In an embodiment, the systems and methods described herein may operate on the information handling system such that the method is executed "on-the-box" such that a wired or wireless network connection to a network is not necessary for operation of the method. In another embodiment, some modules, databases, and/or processing resources may be maintained on a remote server and a wired or wireless network connection can be made with these remote servers and the method may be implemented as described herein.

In an embodiment, the method 700 may include, at block 702, the hardware processor or other hardware processing device of the information handling system executing computer-readable program code instructions of an AI productivity tool software module with a universal user conversational interface software application to receive user-query input. In an embodiment, the universal user conversational interface software application of the AI productivity tool may be any application that can receive input from a user such as text input via the keyboard, image or touch input via a touchpad, or speech input via the microphone, for example, and supports a plurality of supported languages. In some embodiments, text or audio may be received by the universal user conversational interface software application may include interfaces of the one or more AI productivity tool-enablable software modules.

Therefore, at block 704, the method 700 includes determining whether any user-query input has been received at the AI productivity tool software module. Where, at block 704, no user-query input is received, the method 700 returns to block 702 with the AI productivity tool software module continuing to monitor for this input via the execution of the computer readable code instructions of the universal user conversational software application.

Where, at block 704, the AI productivity tool software module does detect and receive user-query input, the method 700 continues to block 706 with the user the execution of the computer readable code instructions of the universal user conversational software application determining the supported language or languages used by the user in submitting the user query input. As described in embodiments herein, the universal user conversational software application executes to further determine the portion of terms in the received user query input that are in a primary language, similar to that used in natural language descriptions of the available capabilities stored in a natural language capabilities database, if any.

At block 708, a user may provide a natural language user query input such as "risolvere il codici di errore 0xc0000142." In such a scenario the hardware processor executing computer readable code instructions of a text embedding module of the AI productivity tool to generate a query intent value for use with semantic search methodologies described above. Execution of a text embedding module of the query intent determination module of the AI productivity tool may embed the user query input, in any language or blended languages, in a vectorized query intent value similar to a query intent value for the English version of "resolve error code 0xc0000142." Such embedded query intent value is now language agnostic. However, as described, semantic comparison of these vector intent values for the query to capabilities may be limited due to the specific nature of the error code recited. In such a case, it may be useful to also perform a TF-IDF comparison for the user query input across the stored natural language descriptions of the capabilities within the natural language capabilities database to identify the capability that best addresses the specific term "0xc0000142."

Nonetheless, a semantic similarity comparison of the query intent value for the user query input to the plurality of capability intent values is conducted as a baseline comparison at block 708. The hardware processor executing machine readable code instructions for the similarity search module of the query intent to capability determination module may execute a cosine similarity search or other semantic similarity search score determining a degree of mathematical vector similarity between the query input intent value for the user query input, in any supported language, and the capability intent value for plural capabilities stored within the capability intent values database.

At block 710, the hardware processor executes computer readable code instructions of the similarity search module to also conduct a TF-IDF keyword similarity search between the user query input in natural language with a plurality of natural language descriptions of capabilities of the AI productivity tool-enableable software applications store in a natural language capability database in embodiments herein. The TF-IDF keyword similarity search score resulting from this TF-IDF keyword similarity search is used to weight the semantic cosine similarity search scores determined above. For example, the semantic cosine similarity search may identify that an error code needs to be resolved, but it may not focus heavily on the term "0xc0000142," which may be important or determinative in finding the right capability or capabilities responsive to this query input. In such an example embodiment, weighting with keyword matching with a natural language capabilities database for an AI productivity tool enableable software application natural language descriptions will effectively assist in responding to the user query input to resolve the error code.

As described herein, execution of a language dependent hybrid weighting algorithm may be used in order to increase the accuracy of the cosine or other semantic similarity search scores, such as 383*a* to 383*n* of FIG. 3 above, in determining when a capability for an AI productivity tool enableable software application may address the user's request within a received user query input. In embodiments herein, the hardware processor executing machine readable code instructions for the query intent to capability determination module of the OTB AI productivity tool in an embodiment may, for each comparison of the user query input with a natural language descriptions of the plural capabilities, perform a TF-IDF or other keyword comparison in addition to the cosine or other semantic similarity search score performed at block 708. This may be repeated for each of the natural language capabilities stored within the natural language capabilities database. However, in an embodiment herein, the user query input, such as "risolvere il codici di errore 0xc0000142," has been received, in a large portion, in a non-primary, second language (e.g., Italian) that is not the same as the primary language used with the natural language descriptions (e.g., English) of capabilities in the AI productivity tool.

At block 712, the execution of the universal user conversational interface software may determine both that the second language (e.g., Italian) is a supported language and invoke execution of computer readable code instructions of a language dependent hybrid weighting algorithm to analyze the terms in the received user query input. The hardware processor executing code instructions of the language dependent hybrid weighting algorithm may determine the number of words or percentage of the user query input that occurs in the primary language in an embodiment. Further, the hardware processor executing code instructions of the language dependent hybrid weighting algorithm may determine an importance or uniqueness score to any words detected in the user query input that occur in the primary language as a keyword relevance score for use with a keyword relevance score category in an embodiment.

In the example embodiment, one word or about 15 percent of the user query input 591 for "risolvere il codici di errore 0xc0000142" comprises the primary language term "0xc0000142." However, the single word "0xc0000142" in the user query input is a unique word with high keyword relevance score. Such a high keyword relevance score for "0xc0000142" may put that term in a high keyword relevance category with a minimum variable weighting factor value in an embodiment. Accordingly, the language dependent hybrid weighting algorithm assigns variable levels of weighting to the TF-IDF keyword similarity score via such a variable weighting factor. In this way, the language dependent hybrid weighting algorithm generates variable weighting factor from the portion of the user query input determined to be in a primary language and based on those primary language terms that have higher relevance keyword relevance scores in the user query input according to embodiments herein.

In an embodiment, each of these cosine similarity search scores may be weighted by a TF-IDF keyword comparison similarity score at various levels of weighting determined by the language dependent hybrid weighting algorithm, depending on the language or blend of languages used, in order to increase the accuracy of the cosine similarity or other semantic search scores in determining a responsive capability or capabilities for an AI productivity tool enableable software application.

The variable weighting factor, for example between 0 and 1, determined by execution of the language dependent hybrid weighting algorithm is dependent on several factors including number of words or percentage of the user query input that occurs in the primary language and an import or uniqueness keyword relevance score to any words detected in the user query input that occur in the primary language as a keyword relevance score in an embodiment. For example, if the entire user query input is received in a primary language with at least one term that has a high keyword relevance score, the variable weighting factor of 1 would be applied to the TF-IDF keyword comparison similarity score for full weighting to be applied with the lexical TF-IDF keyword comparison similarity score to generate the TF-IDF weighted cosine similarity search scores such as 494*a* to 494*n* as described in the embodiment of FIG. 4 above.

However, when a portion of the user query input 591 contains only a percentage of terms in the primary language that may reduce the variable weighting factor below 1 from the language dependent hybrid weighting algorithm 557. For example, 15% of the user query input 591 for "risolvere il codici de errore 0xc0000142" may include a primary language term. Thus, the variable weighting factor 0.15 may be used. However, the single word "0xc0000142" in the user query input 591 is a unique word with high keyword relevance, and accordingly, may require that the variable weighting factor be at or above 0.5 or be at a weighting factor of 0.75 with a high keyword relevance score for at least one word the user query input in one example embodiment. In other embodiments, the variable weighting factor may include the keyword relevance score determined variable weighting factor value when at least one keyword is in the primary language added to the portion of terms in the user query input in the primary language. For example, 0.75 for a highly relevant keyword "0xc0000142" plus the 0.15 for the portion of terms in "risolvere il codici de errore 0xc0000142" in a primary language in an embodiment. In this latter example embodiment, the variable weighting factor may be 0.90 applied to the TF-IDF weighting meaning the TF-IDF weighting is largely influential in determination of the responsive capability or capabilities. In yet other embodiments, the number or percentage of primary language words or the keyword relevance score may be set, via a table or other data construct, to yield various variable weighting factors between 0 and 1. Finally, if the user query input contains no primary language terms, and thus no terms with high keyword relevance, the variable weighting factor from the language dependent hybrid weighting algorithm would be 0, effectively turning off any weighting from the TF-IDF keyword comparison similarity scores.

Thus, at block 714, the execution of computer readable code instructions of the AI productivity tool query intent to capability determination module may apply this variable weighting factor to the TF-IDF keyword comparison score weighting to generate the language-dependent hybrid weighted semantic search scores that result from semantic comparison having the lexical TF-IDF weighting as modified by the variable weighting factor in embodiments herein. Plural language-dependent hybrid weighted semantic search scores are generated for the plural available capabilities of AI productivity tool enableable software applications on the information handing system by the AI productivity tool. These language-dependent hybrid weighted semantic search scores may be selected among to determine a responsive capability to the user query input, regardless of the supported language used by the user.

Proceeding to block 716, execution of computer readable code instructions of the OTB AI productivity tool query intent-to-capability module may identify the capability or capabilities with the highest language-dependent hybrid weighted semantic similarity search scores or one or more capabilities having language-dependent hybrid weighted semantic similarity search scores above a score threshold level, for example 0.7 or another threshold on a scoring scale of 0 to 1. The language-dependent hybrid weighted semantic similarity search scores may have accounted for accuracy benefits of the TF-IDF matching with TF-IDF lexical weighting as modified for the language or languages detected in the received user query input. For example, the capability or capabilities that include the keyword "0xc0000142" in an example embodiment, for a blended language user query input "risolvere il codici di errore 0xc0000142" may still yield capabilities with the highest language-dependent hybrid weighted semantic similarity search scores or ones that meet a threshold score level may be identified via execution of computer readable code instructions of the query intent to capability determination module. The one or more best match capability or capabilities or those meeting a language-dependent hybrid weighted semantic similarity search score threshold are identified as most likely to address the user's intended request within the natural language user query input, despite a non-primary, second supported language being largely used in the user query input. In such a way, the hardware processor executing code instructions for the query intent to capability module for the OTB AI productivity tool may enhance semantic search performance by also still considering critical keywords from within a blended non-primary second language user query input when determining a matching capability or capabilities of an AI productivity tool enableable software application that is most likely to address the user's intent within the user query input.

At block 718, the method 700 includes executing the best match capability or capabilities associated with one or more AI productivity tool-enablable software applications to change features, settings, or execute other capability intent actions on the information handling system for the user based on the user-query input according to the highest language-dependent weighted semantic similarity search score for a capability or capabilities with language-dependent weighted semantic similarity search scores above a set threshold level in embodiments herein. This capability is responsive to the user-query input originally presented to the information handling system by the user, regardless of which supported language or languages used, while preserving the additional accuracy, where available, of a TF-IDF weighting.

At block 720, the method 700 includes determining if the information handling system is still initiated. Where the information handling system is still initiated, the method 700 proceeds to block 702 as described herein. Where the information handling system is no longer initiated, the method 700 may end here.

The blocks of the flow diagram of FIGS. 6 and 7 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system executing computer readable code instructions for an on the box (OTB) artificial intelligence (AI) productivity tool for selecting a capability of an AI productivity tool-enablable software application in responding to a user query input comprising:

a hardware processor receiving a user query input including blended terms in a primary language and a secondary language from a user via an input/output device and executing computer-readable program code instructions of a language dependent hybrid weighting algorithm to generate a variable weighting factor determined from of a portion of the blended terms in the user query input that are in the primary language and a first term of the blended terms that is identified as having a high keyword relevance score, wherein the primary language is also used in natural language descriptions that are stored in a natural language capability database on the information handling system for capabilities of AI productivity tool-enableable software applications on the information handling system;

the hardware processor executing computer-readable program code instructions to perform a cosine semantic similarity search comparing capability intent values of the capabilities to a query input intent value of the user query input for the blended terms in both the primary language and the secondary language to generate a semantic search score;

the hardware processor determining a text frequency-inverted document frequency (TF-IDF) keyword comparison score from comparison between natural language of the user query input in the primary language and the secondary language and the natural language descriptions of each of the capabilities in the primary language;

the hardware processor executing computer-readable program code instructions generating a language-dependent hybrid weighted semantic search score for each of the capabilities by weighting the cosine similarity search score by the TF-IDF keyword comparison score, where the TF-IDF keyword comparison score is modified by the variable weighting factor generated from the blended terms identified in the primary language and the first term of the blended terms having the high keyword relevance score; and the hardware processor executing computer-readable program code instructions to identify and execute a best match capability responsive to the received user query input having a capability intent value that generates a highest language-dependent hybrid weighted semantic search score.

2. The information handling system of claim 1 further comprising:

the hardware processor executing computer-readable program code instructions of a query embedding algorithm module of the OTB AI productivity tool to generate the query input intent value for the user query input to performing the cosine semantic similarity search comparing the capability intent values of the capabilities to the query input intent value.

3. The information handling system of claim 1 further comprising:

the hardware processor executing computer-readable program code instructions of the AI productivity tool-enablable software application having the best match capability to execute that best match capability on the information handling system in response to the received user query input.

4. The information handling system of claim 1 further comprising:

the hardware processor executing computer-readable program code instructions of plural AI productivity tool-enablable software applications for plural best match capabilities, having language-dependent hybrid weighted semantic search scores exceeding a score threshold, to execute those plural best match capabilities on the information handling system in response to the received user query input.

5. The information handling system of claim 1, wherein the capability intent values are generated by execution of code instructions for a text embedding algorithm and mathematically represent semantic meaning for words or phrases within the natural language descriptions for the capabilities for correlation with the query intent input value generated from the user query input text.

6. The information handling system of claim 1, wherein the cosine semantic similarity search determines a degree of angular similarity between vector values for the capability intent values and the query input intent value for the capabilities of the AI productivity tool-enableable software applications available on the information handling system to respond to user query inputs.

7. The information handling system of claim 1, wherein a second portion of the terms in the user query input are in a non-primary second language that is not used in the natural language descriptions of capabilities of AI productivity tool-enableable software applications.

8. The information handling system of claim 1, wherein the hardware processor executing computer-readable program code instructions generating the language-dependent hybrid weighted semantic search score for each of the capabilities includes multiplying the TF-IDF keyword comparison score by the variable weighting factor that is between 0 and 1 to modify the weighting of the cosine similarity search score by the TF-IDF keyword comparison score.

9. The information handling system of claim 1, wherein when hardware processor executing computer readable code instructions determines that the user query input contains no primary language terms, and thus no terms with high keyword relevance score, the variable weighting factor from the language dependent hybrid weighting algorithm is 0 as a multiplier of the TF-IDF keyword comparison similarity scores to turn off any weighting from the TF-IDF keyword comparison similarity scores.

10. A method for executing computer readable code instructions of an on the box (OTB) artificial intelligence (AI) productivity tool at an information handling system to respond to a user query input comprising:

receiving a user query input including blended terms in a primary language and a secondary language from a user, via an input/output device;

executing computer-readable program code instructions, via a hardware processor, of language dependent hybrid weighting algorithm to determine a variable weighting factor based on a portion of the blended terms in the user query input that are in the primary language and a first term of the blended terms identified as having a high keyword relevance score category, wherein the primary language is also used in natural language descriptions that are stored in a natural language capability database on the information handling system for capabilities of AI productivity tool-enableable software applications on the information handling system;

executing computer-readable program code instructions to perform a cosine semantic similarity search comparing capability intent values of the capabilities to a query input intent value of the user query input for the blended terms in both the primary language and the secondary language to generate a semantic search score and determining a lexical keyword comparison score from comparison between natural language of the user query input for the blended terms in both the primary language and the secondary language with the natural language descriptions of each of the capabilities;

executing computer-readable program code instructions generating a language-dependent hybrid weighted semantic search score for each of the capabilities by weighting the cosine similarity search score by the lexical keyword comparison score, where the lexical keyword comparison score is further modified by the variable weighting factor for each of the capabilities generated from the blended terms identified in the primary language and the first term of the blended terms having the high keyword relevance score; and executing computer-readable program code instructions to identify and execute a plurality of responsive capabilities to the received user query input that have language-dependent hybrid weighted semantic search scores that exceed a language-dependent hybrid weighted semantic search score threshold.

11. The method of claim 10 further comprising:

executing computer-readable program code instructions of a query embedding algorithm module of the OTB AI productivity tool to generate the query input intent value for the user query input to performing the cosine semantic similarity search comparing the capability intent values of the capabilities to the query input intent value.

12. The method of claim 10 further comprising:

executing computer-readable program code instructions of plural AI productivity tool-enablable software applications for plural matched capabilities, having language-dependent hybrid weighted semantic search scores exceeding a score threshold, to execute those plural matched capabilities on the information handling system in response to the received user query input.

13. The method of claim 10, wherein a second portion of the terms in the user query input are in a non-primary second language that is not used in the natural language descriptions of capabilities of AI productivity tool-enableable software applications.

14. The method of claim 10, wherein the hardware processor executing computer-readable program code instructions generating the language-dependent hybrid weighted semantic search score for each of the capabilities includes multiplying a text frequency-inverted document frequency (TF-IDF) keyword comparison score by the variable weighting factor that is between 0 and 1 to modify the weighting of the cosine similarity search score by the TF-IDF keyword comparison score.

15. The method of claim 10, wherein when executing computer readable code instructions determines that the user query input contains only primary language terms, the variable weighting factor from the language dependent hybrid weighting algorithm is 1 as a multiplier of the lexical keyword comparison similarity scores to fully utilize weighting from the lexical keyword comparison similarity scores.

16. An information handling system executing computer readable code instructions for an on the box (OTB) artificial intelligence (AI) productivity tool for selecting a capability of an AI productivity tool-enablable software application in responding to a user query input comprising:

a hardware processor receiving a user query input including blended terms in a primary language and a secondary language from a user via an input/output device and executing computer-readable program code instructions of language dependent hybrid weighting algorithm to generate a variable weighting factor determined from a portion of the blended terms in the user query input that are in the primary language and a first term of the blended terms identified as having a high keyword relevance score, wherein the primary language is also used in natural language descriptions that are stored in a natural language capability database on the information handling system for capabilities of AI productivity tool-enableable software applications on the information handling system;

the hardware processor executing computer-readable program code instructions to perform a cosine semantic similarity search comparing capability intent values of the capabilities to a query input intent value of the user query input having the blended terms in the primary language and the secondary language to generate a semantic search score;

the hardware processor determining a lexical keyword comparison score from comparison between natural language of the user query input having the blended terms in the primary language and the secondary language and the natural language descriptions of each of the capabilities in the primary language;

the hardware processor executing computer-readable program code instructions generating a language-dependent hybrid weighted semantic search score for each of the capabilities by weighting the cosine similarity search score by the lexical keyword comparison score for each of the capabilities, where each lexical keyword comparison score is modified by the variable weighting factor generated from the blended terms identified in the primary language and the first term of the blended terms having the high keyword relevance score; and the hardware processor executing computer-readable program code instructions to identify and execute one or more best match capabilities responsive to the received user query input having capability intent values that generate the highest language-dependent hybrid weighted semantic search scores.

17. The information handling system of claim 16 further comprising:

the hardware processor executing computer-readable program code instructions of a query embedding algorithm module of the OTB AI productivity tool to generate the query input intent value for the user query input to perform the cosine semantic similarity search comparing the capability intent values of the capabilities to the query input intent value.

18. The information handling system of claim 16 further comprising:

the hardware processor executing computer-readable program code instructions of plural AI productivity tool-enablable software applications for plural best match capabilities, having language-dependent hybrid weighted semantic search scores exceeding a score threshold, to execute those plural best match capabilities on the information handling system in response to the received user query input.

19. The information handling system of claim 16, wherein a second portion of the terms in the user query input are in a non-primary second language that is not used in the natural language descriptions of capabilities of AI productivity tool-enableable software applications.

20. The information handling system of claim 16, wherein the hardware processor executing computer-readable program code instructions generating the language-dependent hybrid weighted semantic search score for each of the capabilities includes multiplying the lexical keyword comparison score by the variable weighting factor that is between 0 and 1 to modify the weighting of the cosine similarity search score by the lexical keyword comparison score.

* * * * *